(12) United States Patent
Kawanaka et al.

(10) Patent No.: US 11,321,056 B2
(45) Date of Patent: May 3, 2022

(54) PROGRAM CREATION ASSISTANCE DEVICE

(71) Applicant: Keyence Corporation, Osaka (JP)

(72) Inventors: Masashi Kawanaka, Osaka (JP); Motohiro Kudo, Osaka (JP); Shinya Kameoka, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 17/066,503

(22) Filed: Oct. 9, 2020

(65) Prior Publication Data

US 2021/0149644 A1  May 20, 2021

(30) Foreign Application Priority Data

Nov. 19, 2019 (JP) .............................. JP2019-209188

(51) Int. Cl.
*G06F 8/30* (2018.01)
*G06F 8/33* (2018.01)
*G06F 8/34* (2018.01)

(52) U.S. Cl.
CPC .............. *G06F 8/34* (2013.01); *G06F 8/313* (2013.01); *G06F 8/33* (2013.01)

(58) Field of Classification Search
None
See application file for complete search history.

(56) References Cited

U.S. PATENT DOCUMENTS

| 6,449,492 B1* | 9/2002 | Kenagy | H04M 1/724 |
| | | | 455/550.1 |
| 6,552,647 B1* | 4/2003 | Thiessen | G05B 15/02 |
| | | | 122/448.1 |
| 6,894,623 B2 | 5/2005 | Hama et al. | |
| 6,979,814 B2 | 12/2005 | Kudo et al. | |
| 7,368,702 B2 | 5/2008 | Kudo et al. | |

(Continued)

FOREIGN PATENT DOCUMENTS

JP         20054557 A      1/2005

OTHER PUBLICATIONS

U.S. Appl. No. 17/066,491, filed Oct. 9, 2020 (65 pages).
U.S. Appl. No. 17/066,499, filed Oct. 9, 2020 (62 pages).
U.S. Appl. No. 17/066,501, filed Oct. 9, 2020 (72 pages).

*Primary Examiner* — Philip Wang
(74) *Attorney, Agent, or Firm* — Kilyk & Bowersox, P.L.L.C.

(57) ABSTRACT

The present invention provides a mechanism for adding a disabling function that satisfies a safety standard to a safety program in a simplified procedure. A program creation assistance device that assists in creation of a safety program to be executed by a safety controller creates a safety program including an input block to which a safety input signal from an input device is assigned, a functional block that implements a safety function, and an output block that outputs a safety output signal, and adds, to the safety program created, a plurality blocks and connections between the plurality of blocks in accordance with an instruction from a user, the plurality of blocks and the connections between the plurality of blocks being configured to implement a disabling function that disables the safety input signal when a predetermined condition is satisfied in the safety program.

11 Claims, 16 Drawing Sheets

(56) References Cited

U.S. PATENT DOCUMENTS

| | | | |
|---|---|---|---|
| 7,411,319 B2 | 8/2008 | Suhara et al. | |
| 7,696,469 B2 | 4/2010 | Inoue et al. | |
| 7,821,394 B2 | 10/2010 | Fukumura | |
| 8,648,292 B2 | 2/2014 | Kawabata et al. | |
| 10,317,516 B2 | 6/2019 | Tomoshi et al. | |
| 2006/0150148 A1* | 7/2006 | Beckett | G06F 9/541 |
| | | | 717/109 |
| 2007/0055863 A1* | 3/2007 | Araki | G05B 19/058 |
| | | | 713/151 |
| 2010/0100855 A1* | 4/2010 | Yoo | G06F 3/0486 |
| | | | 715/863 |
| 2014/0222383 A1* | 8/2014 | Eitzman | G05B 19/4068 |
| | | | 703/1 |
| 2015/0147057 A1* | 5/2015 | Antony | G06F 3/0607 |
| | | | 398/45 |
| 2015/0185708 A1* | 7/2015 | Prosak | G05B 19/056 |
| | | | 700/79 |
| 2015/0186118 A1* | 7/2015 | Prosak | G05B 19/056 |
| | | | 717/109 |
| 2015/0187524 A1* | 7/2015 | Prosak | G05B 19/0426 |
| | | | 361/160 |
| 2016/0259313 A1* | 9/2016 | Liu | G05B 23/0216 |
| 2016/0334925 A1* | 11/2016 | Ohki | G06F 3/04847 |
| 2017/0262568 A1* | 9/2017 | Sakurai | G05B 19/0425 |
| 2018/0259926 A1* | 9/2018 | Fujimura | G06F 3/0481 |
| 2020/0004555 A1* | 1/2020 | Bossek | G06F 9/4411 |
| 2020/0259432 A1* | 8/2020 | Ando | H02P 3/18 |
| 2021/0011449 A1* | 1/2021 | Klesk | F16P 3/00 |

* cited by examiner

PROGRAM CREATION ASSISTANCE DEVICE

CROSS-REFERENCE TO RELATED APPLICATIONS

The present application claims foreign priority based on Japanese Patent Application No. 2019-209188, filed Nov. 19, 2019, the contents of which are incorporated herein by reference.

BACKGROUND OF THE INVENTION

1. Field of the Invention

The present invention relates to a program creation assistance device that assists in creation of a safety program that runs on a safety system.

2. Description of Related Art

Many industrial machines operate in a production factory that produces products (workpieces). A safety system is an essential system for securing the safety of humans against such industrial machines. In most cases, the safety system brings an industrial machine into emergency stop when a human enters an operating area of the industrial machine.

Further, for the safety system, unlike during normal operation, it is assumed that a worker will enter a predetermined area and perform maintenance on a device (JP 2005-004557 A). When such maintenance work is performed in a normal mode during normal operation, the industrial machine will be brought into emergency stop. Therefore, it is required that the safety system have, in addition to such a normal mode, a maintenance mode that allows work to be performed in the predetermined area on condition that a safety standard is satisfied.

A computer program that runs on such a safety system is called a safety program. The safety program is intended to protect the safety of humans and thus needs to be designed more accurately. When the creation of the safety program is complicated, a bug is likely to occur. It is therefore desirable to provide a program creation environment that allows a user to easily create the safety program. For example, a function block diagram (FBD) is known, based on which a plurality of function blocks are placed at random, and some of the function blocks are connected, so that the safety program is created.

However, even when the safety program is created using the FBD, a configuration of the function blocks for implementing a disabling function in the maintenance mode is complicated, and thus it is difficult for the user to make a design by combining the function blocks. The disabling function is a function of forcibly determining a predetermined safety input to be ON when a specific condition is satisfied. That is, the disabling function is configured to permit the worker to enter an area monitored by a sensor or the like corresponding to the predetermined safety input. Therefore, the disabling function is likely to pose a danger to the worker if the corresponding safety program is designed incorrectly, which increases a burden on a designer.

SUMMARY OF THE INVENTION

It is therefore an object of the present invention to provide a mechanism for adding a disabling function that satisfies a safety standard to a safety program in a simplified procedure.

Provided according to an aspect of the present invention is, for example, a program creation assistance device that assists in creation of a safety program to be executed by a safety controller, the program creation assistance device including a creation unit that creates a safety program including an input block to which a safety input signal from an input device is assigned and a functional block that implements a safety function, and an addition unit that adds, to the safety program created by the creation unit, a plurality blocks and connections between the plurality of blocks in accordance with an instruction from a user, the plurality of blocks and the connections between the plurality of blocks being configured to implement a disabling function that disables the safety input signal when a predetermined condition is satisfied in the safety program.

According to the aspect of the present invention, it is possible to add the disabling function that satisfies a safety standard to the safety program in a simplified procedure.

DETAILED DESCRIPTION OF PREFERRED EMBODIMENTS

Figure 1:
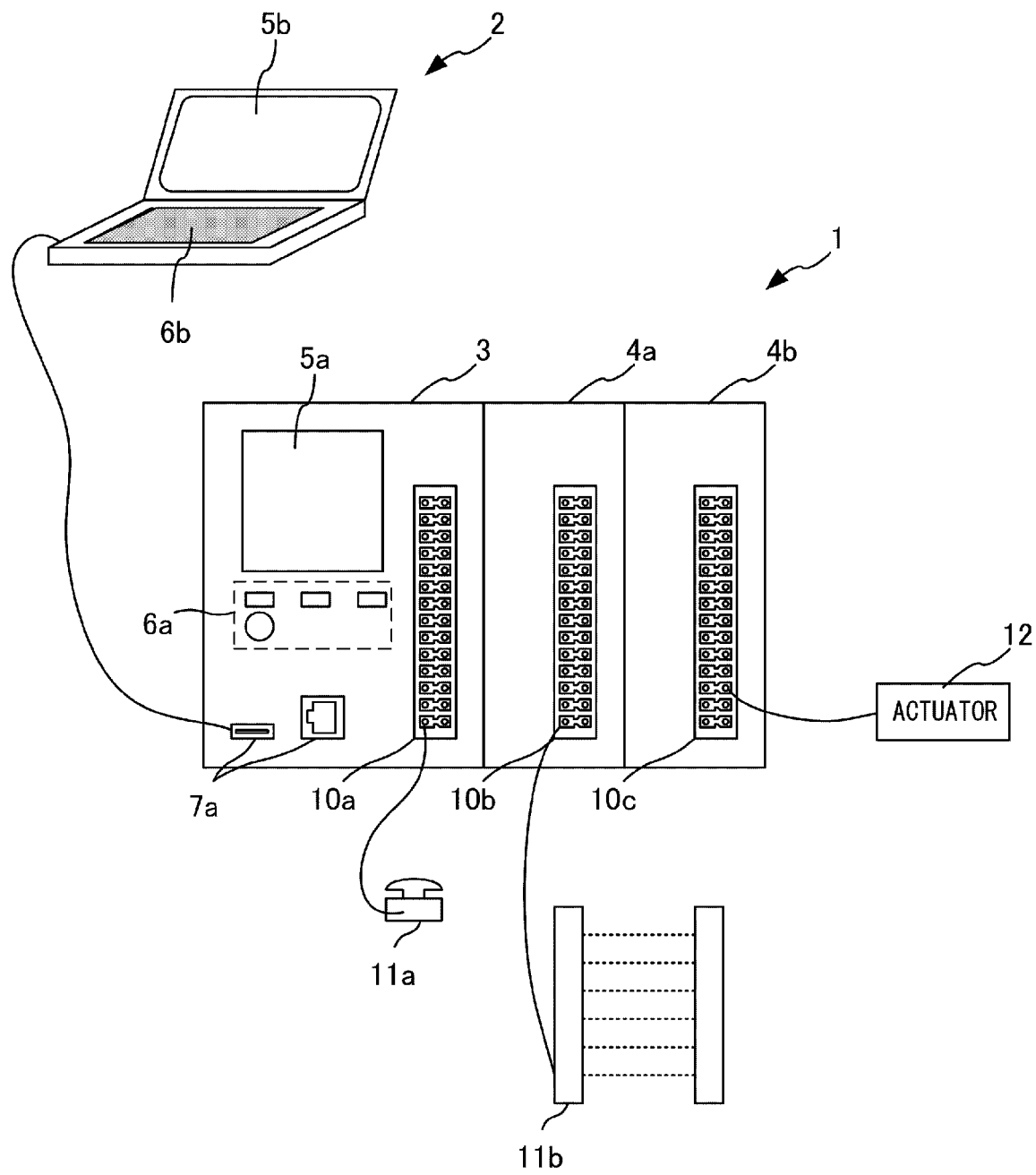
FIG. 1 is diagram for describing a safety controller system.

An embodiment will be described below in detail with reference to the accompanying drawings. Note that the following embodiment is not intended to restrict the invention according to the claims, and all combinations of the features described in the embodiment are not essential to the invention. At least two of the plurality of features described in the embodiment may be selectively combined. Further, the same or similar components are denoted by the same reference numerals, and no repetition of the same description is made. In particular, lowercase alphabets are given to make a distinction between a plurality of components of the same type, and when a description common to a plurality of components is given, the lowercase alphabets may be omitted.

<Safety Controller System>

FIG. 1 shows the whole of a system. In this example, a safety controller system 1 includes a main module (main controller) 3 and extension modules 4a, 4b. The main module 3 executes a safety program transferred from a PC 2 that serves as a creation assistance device to assist a user in creating the safety program. The main module 3 includes a display device 5a, a control panel 6a, a communication connector 7a, an IO connector 10a, and the like. The PC 2 similarly includes a display device 5b and a control panel 6b. The communication connector 7a may be a USB connector or a wired LAN connector. A communication cable from the PC2 is connected to the communication connector 7a. The wired LAN may be industrial Ethernet (registered trademark). LAN is an abbreviation for local area network. A safety input device 11a such as an emergency stop switch or a light curtain is connected to an input terminal of the IO connector 10a. An industrial device such as a robot arm is connected, as an actuator, to an output terminal of the IO connector 10a. The main module 3 performs an arithmetic operation on an input value input from the safety input device 11a in accordance with the safety program to obtain an output value and outputs the output value to the actuator 12. For example, when the emergency stop switch that is a type of safety input device 11a, is pressed down, the main module 3 changes the output value from ON (safe) to OFF (not safe). This brings the actuator 12 to a stop. In some case, the IO connector 10a provided in the main module 3 cannot accept connections from all safety input devices and actuators. In order to deal with such a case, the extension modules 4a, 4b are connected to the main module 3. The extension modules 4a, 4b include IO connectors 10b, 10c, respectively, and are capable of accepting connections from a safety input device 11b, the actuator 12, and the like. The extension modules 4a, 4b and the main module 3 communicate with each other to transfer an input signal and an output signal. That is, the main module 3 generates the output signal by applying the safety program to the input signals acquired from the safety input device 11a connected to the main module 3 and from the safety input device 11a connected to the extension modules 4a, 4b. Furthermore, the main module 3 outputs the output signal generated in accordance with the safety program to the actuator 12 connected to the main module 3 or to the actuator 12 connected to the extension modules 4a, 4b.

<Hardware of Main Module and Extension Module>

Figure 2:
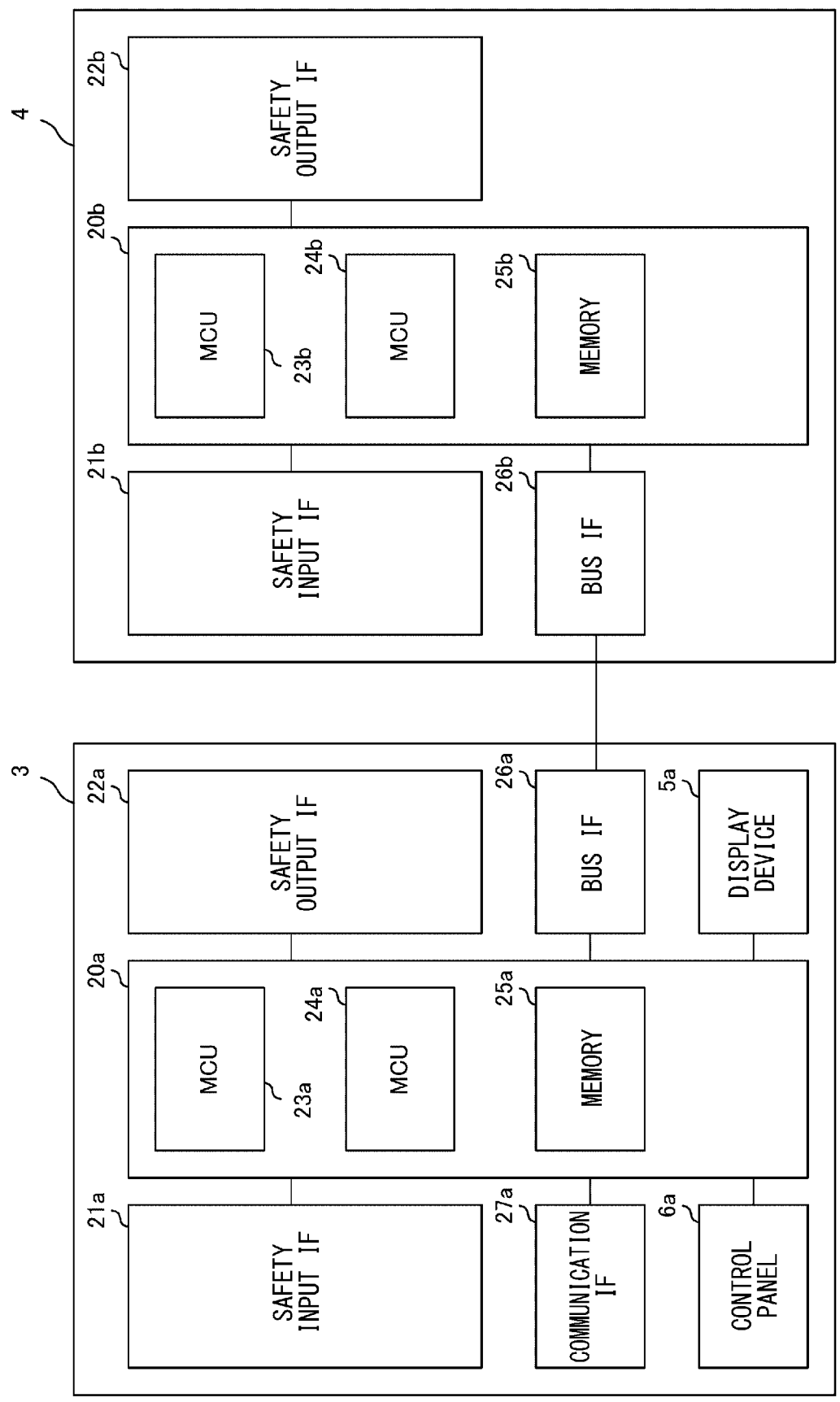
FIG. 2 is a diagram for describing a main module and an extension module.

As shown in FIG. 2, a controller 20a of the main module 3 includes two MCUs 23a, 24a and a memory 25a. The controller 20a stores the safety program received from the PC 2 into the memory 25a. Two micro controller units (MCUs) are provided to increase reliability. The MCUs 23a, 24a each execute the safety program stored in the memory 25a. The MCUs 23a, 24a generate an output signal based on an input signal input from the safety input device 11 via a safety input IF 21a and an input signal input from the extension module 4 via a bus IF 26a, and output the output signal to a safety output IF 22a and the extension module 4. For example, when both of the MCUs 23a, 24a output an ON signal, the safety output IF 22a outputs an ON signal. When either or both of the MCUs 23a, 24a output an OFF signal, the safety output IF 22a outputs an OFF signal. As described above, the controller 20a communicates with the extension module 4 via the bus IF 26a to receive the input signal and send the output signal.

A controller 20b of the extension module 4 includes two MCUs 23b, 24b and a memory 25b. Two micro controller units (MCUs) are provided to increase reliability. The MCUs 23b, 24b each execute a control program stored in the memory 25b. Upon receipt of an input signal from the safety input device 11 via a safety input IF 21b, the controller 20b sends the input signal to the main module 3 via a bus IF 26b. Upon receipt of an output signal from the main module 3 via the bus IF 26b, the controller 20b outputs the output signal to the actuator 12 or the like via the safety output IF 22b.

<Hardware of PC>

Figure 3:
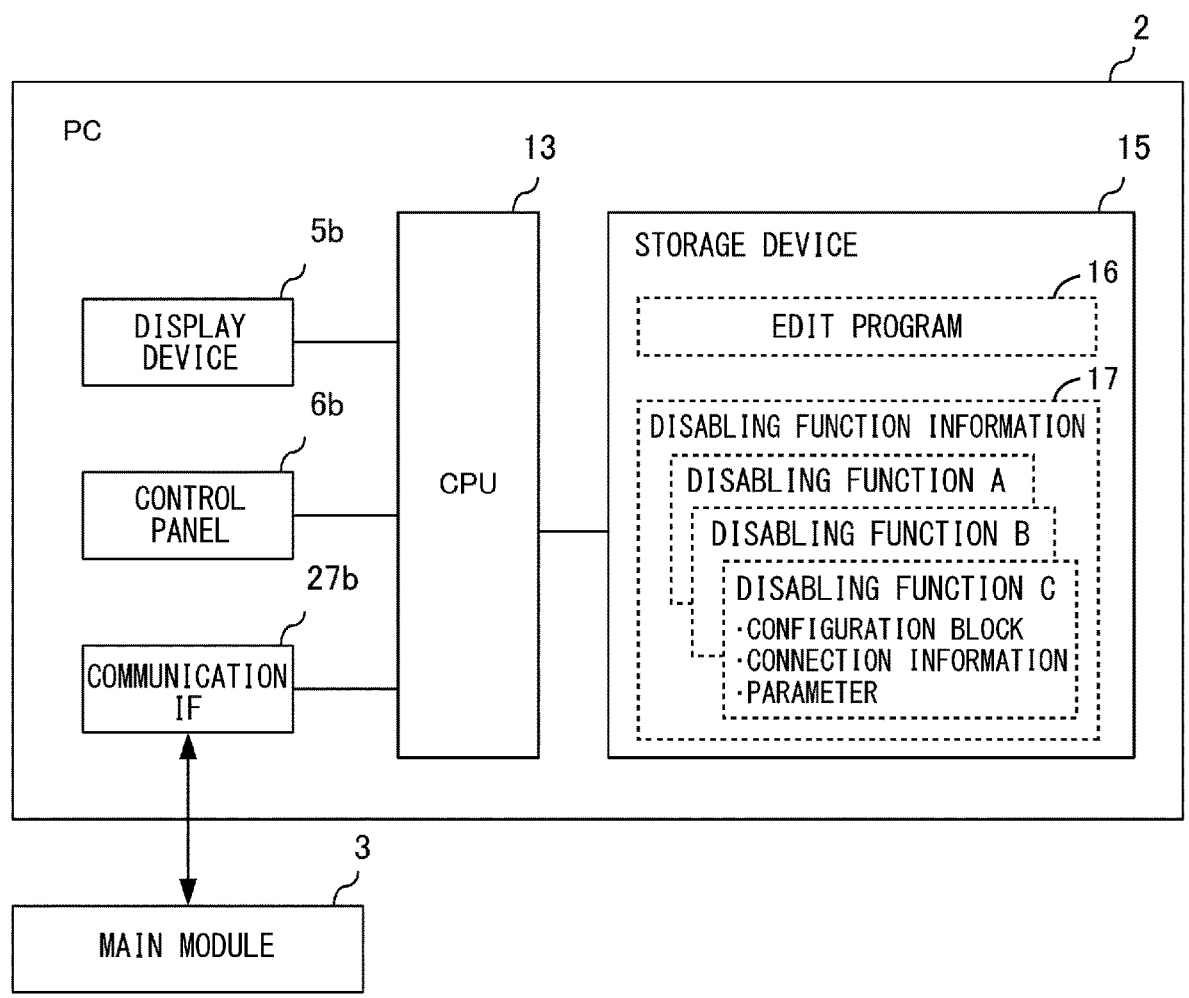
FIG. 3 is a diagram for describing a program creation assistance device.

As shown in FIG. 3, the PC 2 includes a CPU 13, the display device 5b, the control panel 6b, a storage device 15, and a communication IF 27b. The display device 5b, the control panel 6b, the storage device 15, and the communication IF 27b are each electrically connected to the CPU 13. Examples of the storage device 15 include a RAM, a ROM, an HDD, and an SSD, and may further include a removable memory card. CPU is an abbreviation for central processing unit. ROM is an abbreviation for read-only memory. RAM is an abbreviation for random access memory. HDD is an abbreviation for hard disk drive. SSD is an abbreviation for solid state drive.

The storage device 15 stores an edit program 16 and disabling function information 17.

These pieces of information are allowed to be updated later. The user of the PC 2 causes the CPU 13 to execute the edit program 16 stored in the storage device 15 to edit the safety program, configuration information, or the like through the control panel 6b and to transfer the safety program, the configuration information, or the like to the main module 3. The configuration information includes identification information on the extension module 4 connected to the main module 3, and identification information (terminal assignment information) on the safety input device 11 and the actuator 12 each connected to a corresponding one of the input terminals and output terminals provided in the IO connectors 10a to 10c. The disabling function information 17 includes a configuration block, connection information, various parameters, and inquiry information for inquiring of the user for implementing a disabling function to be described later. The configuration block corresponds to a type of each various block, placement information, and the like for implementing the disabling function. The connection information is information representing an input and output connection relation between blocks. The various parameters include a parameter related to each block and a parameter related to the disabling function. The inquiry information includes, for example, information for use in selection of a disabling method to be described later.

<User Interface (UI) in Standard Mode>

Figure 4:
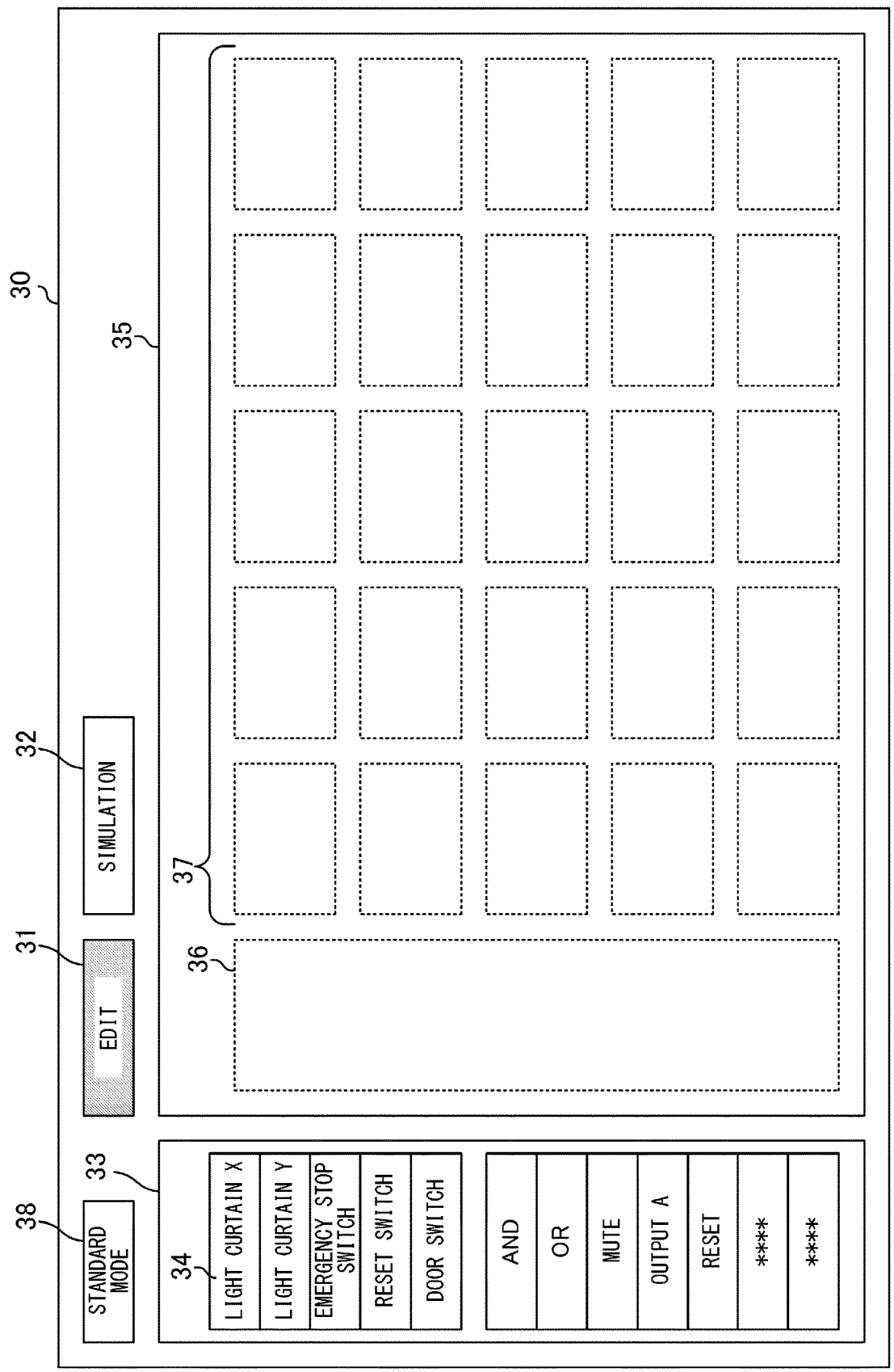
FIG. 4 is diagram for describing a user interface.

FIG. 4 shows a UI 30 in a standard mode to be displayed by the CPU 13 on the display device 5b in accordance with the edit program 16. A display denoted by 38 indicates that the edit program is running in the standard mode. For the creation of the safety program according to the present embodiment, either the standard mode (first mode) that allows programming in a detailed manner or an EASY mode (second mode) that allows programming in a simplified manner as compared with the standard mode is selectable. The standard mode allows the user to freely place and connect an input block to which a safety input signal from an input device is assigned, a functional block (also referred to as a function block) that implements a safety function suitable for a selected safety use, and an output block that outputs a safety output signal. On the other hand, the EASY mode provides, when the user selects a safety use, an unfinished safety program in which the placement and connection of blocks suitable for the safety use have already been made, and allows the user to supplement the unfinished safety program in a simplified manner to bring the unfinished safety program to completion.

An edit button 31 is a button for giving an instruction for editing the safety program. A simulation button 32 is a button for giving an instruction for simulating the safety program. A list section 33 is a display area where a list of function blocks 34 that can be selected by the user is displayed in a selectable manner. A program creation area 35 includes an input placement area 36 where a function block of an input type is placed, and a block placement area 37 where a function block of an operation type and a function block of an output type are placed. The user selects any one of the function blocks 34 from the list section 33 and drag-and-drops the function block 34 thus selected to the input placement area 36 or the block placement area 37. The input placement area 36 and the block placement area 37 are displayed in a scrollable manner, and each allow more function blocks to be placed.

(Editing of Program)

Figure 5:
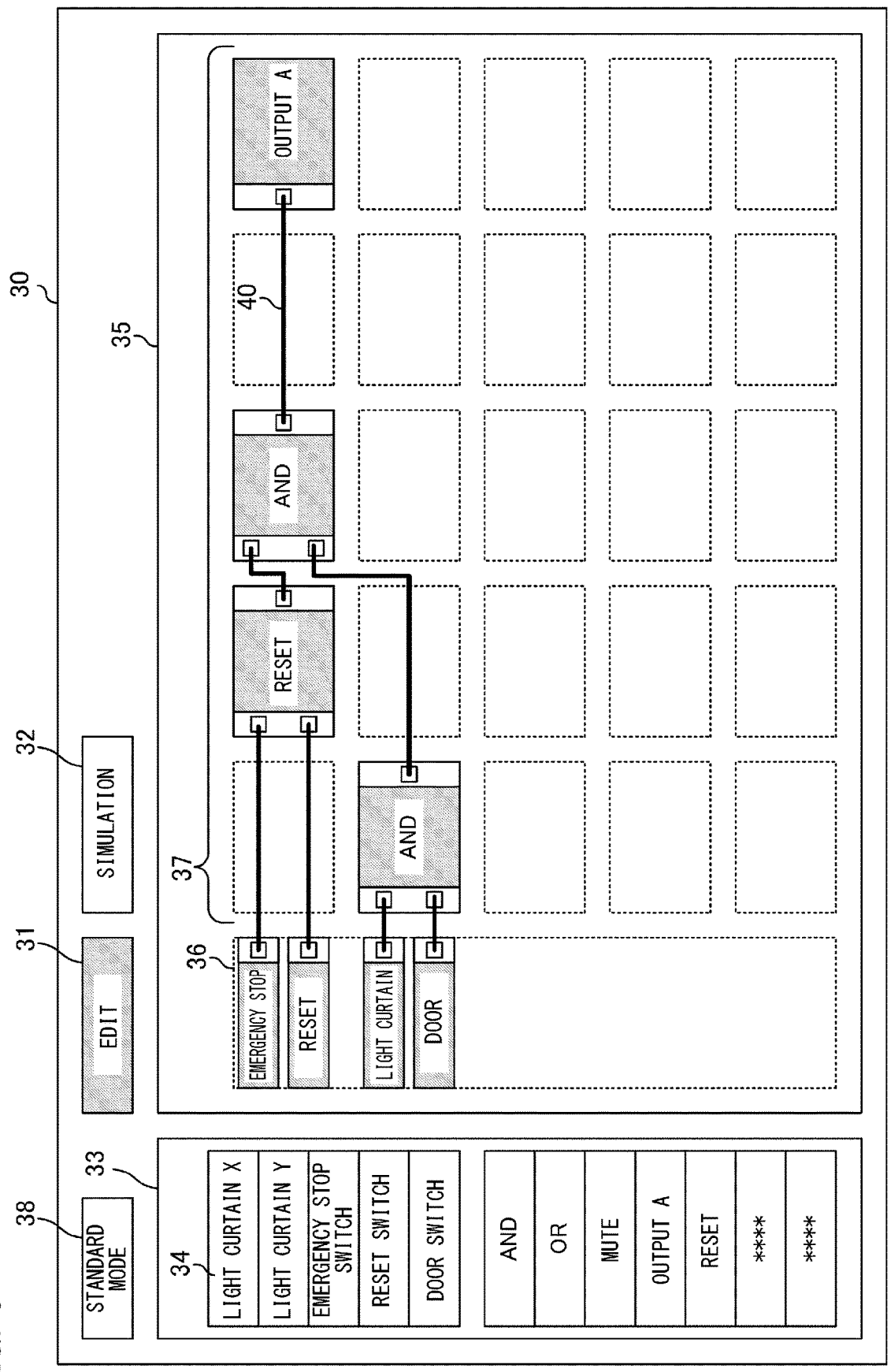
FIG. 5 is a diagram for describing a user interface.

FIG. 5 shows an example of creating the safety program in the standard mode. Input blocks corresponding to the safety input devices 11 connected to the main module 3 and the extension module 4 are placed in the input placement area 36. In FIG. 5, an input block corresponding to an emergency stop switch, an input block corresponding to a reset switch, an input block corresponding to a light curtain X, and an input block corresponding to a door switch are dragged and dropped from the list section 33 to the input placement area 36.

In the block placement area 37, two AND blocks, a reset block, and an output block are placed. The output block corresponds to any one of the output terminals of the I0 connectors 10a to 10c. An icon representing each function block includes an input terminal and an output terminal. The user connects the output terminal of one function block and the input terminal of another function block with a connection line 40 to complete the safety program.

In this example, the reset block outputs ON (safe) when the emergency stop button is not pressed. A left AND block outputs ON when the light curtain is ON and the door switch is ON. The output terminal of the reset block and the output terminal of the left AND block are connected to a right AND block. Therefore, when ON is input to both the two input terminals of the right AND block, the right AND block outputs ON to the output block. When the emergency stop button is pressed, OFF (unsafe) is input to the reset block. As a result, the output of the right AND block switches from ON to OFF, and OFF is transmitted to the output block. The reset block keeps outputting OFF unless the reset switch is pressed. The reset block returns to ON when the reset switch is pressed.

The CPU 13 creates configuration information including information on types of the function blocks and program components that make up the safety program and connection information representing a connection relation between the function blocks, and stores the configuration information into the storage device 15. This configuration causes the safety program to be included in the configuration information. Alternatively, the CPU 13 may link the program components in accordance with the connection information to create the safety program. When the user inputs a transfer instruction, the CPU 13 sends the configuration information and the safety program to the main module 3 to program the main module 3. The configuration information may be part of the safety program.

As described above, the user can create the safety program by combining any function blocks. Note that, when the simulation button 32 is pressed, the CPU 13 displays a simulation UI on the display device 5b.

<Case where Connection Check Succeeds (Program is Completed)>

Figure 6:
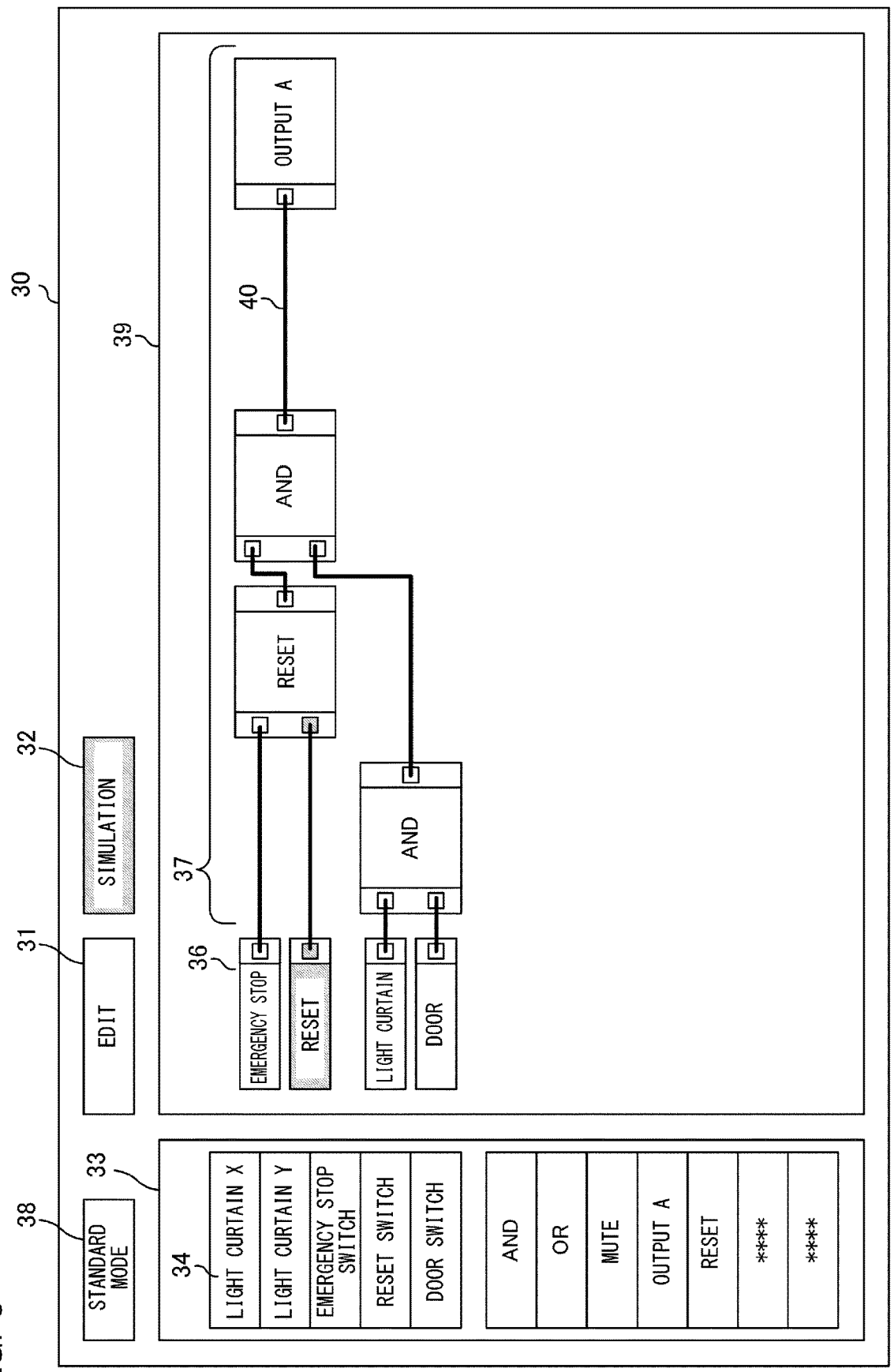
FIG. 6 is a diagram for describing a user interface.

FIG. 6 shows the UI 30 including a simulation screen 39. When the simulation button 32 is pressed, the CPU 13 displays the simulation screen 39 in the UI 30. The simulation screen 39 may be displayed in a window separate from the UI 30. When the user touches or clicks on a function block of the input type, the output of the function block of the input type is inverted (from ON to OFF or from OFF to ON). Such an inversion may be called toggle. Note that the CPU 13 may display a function block outputting ON and a function block outputting OFF in a distinguishable manner. In FIG. 6, a block corresponding to the reset switch is highlighted because the block is touched by the user to be turned to OFF. Note that the CPU 13 may color the function block outputting ON light green (or light blue) and the function block outputting OFF light pink (orange) or the like. Further, the CPU 13 may color both an output terminal outputting ON and an input terminal receiving ON dark green (dark blue). The CPU 13 may color both an output terminal outputting OFF and an input terminal receiving OFF red (dark orange). The CPU 13 performs an operation on input signals to obtain an output signal in response to the input signals for each function block. The user can confirm the overall behavior of the safety program by touching or clicking on any desired input block.

<Case where Connection Check Fails (Program is Not Completed)>

When the simulation button 32 is pressed, the CPU 13 may execute a connection check on a plurality of function blocks placed in the block placement area 37. Depending on the type of function block, terminals that need to be connected and terminals that need not be connected exist. The CPU 13 checks, for all the function blocks, for connection of the connection line 40 to a terminal that needs to be connected. When the connection line 40 is not connected to the terminal that needs to be connected, the CPU 13 determines that the connection check has failed. This disallows the CPU 13 to execute the simulation of the entire safety program, and thus proceeds to individual simulation.

<EASY Mode>

The EASY mode will be described below. In the program creation assistance device according to the present embodiment, either the standard mode (first mode) or the EASY mode (second mode) is selectable as a programming mode via a selection screen (not shown). The standard mode allows, as described with reference to FIGS. 4 and 5, the user to freely select and place an input block, a function block, and an output block, and freely connect terminals. That is, the standard mode is a programming mode having a high degree of freedom. On the other hand, the EASY mode provides, when the user selects a safety use, an unfinished safety program in which blocks suitable for the safety use have been already placed and connected. The unfinished safety program according to the present embodiment is provided in a state where an input device assigned to an input block has yet to be assigned. The user can complete the safety program in a simplified manner by replacing, at user's own discretion, a predetermined input block with an input device.

In the EASY mode, first, input and output devices are registered via a registration screen (not shown). On the registration screen, an input block (input device) and output block (output device or output terminal) of the safety program to be created are registered. Then, the safety use (application) for which the safety program is created is selected via a selection screen (not shown). Provided on the selection screen are choices of safety uses conceivable for each output device selected on the registration screen, and a safety use can be selected in accordance with user input.

The choices of safety uses include, for example, a manual reset, an automatic reset, a manual reset+automatic reset, and a cooperative control. The manual reset is a mechanism where safety is confirmed with reference to ON of a safety input after a safety output is turned to OFF in response to OFF of the safety input, and then the safety output is turned to ON by a reset switch or the like (the safety system is activated). This mechanism is applied to, for example, a reset from a case where the emergency stop switch is operated, a case where a light curtain is installed at an entrance to a hazardous area, or a place where a door may be closed unexpectedly. The automatic reset is a mechanism where safety is confirmed with reference to ON of a safety input after a safety output is turned to OFF in response to OFF of the safety input, and then the safety output is automatically turned to ON. The manual reset+automatic reset is a mechanism that uses both a safety input that operates on the manual basis and a safety input that operates on the automatic reset basis. This is a mechanism where when both the safety inputs are turned to ON, a safety output is turned to ON (the safety system is activated). The collaborative control is simply referred to as a mechanism based on an OR operation of the manual reset+automatic reset. For example, the collaborative control may be applied to a case where an operator and a robot may enter the same hazardous area, and then a light curtain installed at each entrance is controlled. In this case, when only the safety input of one of the light curtains is turned to OFF, the safety output is not turned to OFF because a human and a robot do not enter the hazardous area at the same time, and when both the light curtains are turned to OFF, the safety output is turned to OFF.

Further, the choices of safety uses may further include a safety use based on a two-input system and a safety use based on a one-input system as a type of lock control in accordance with a safety output (unlock output) to be set. Furthermore, it is possible to select a case where an unlock permission input is used or a case where the unlock permission input is not used. The unlock permission input is applied to a case where it is desired to control unlock permission timing, for example, to prevent the door from opening while the device is in operation. As described above, according to the present embodiment, a suitable selection screen is provided to the user in accordance with a registered safety output and allows the user to select a safety use. When the safety use is selected, the unfinished safety program is provided to the user in an editable manner.

<UI in EASY Mode>
(Edit Screen)

Figure 7:
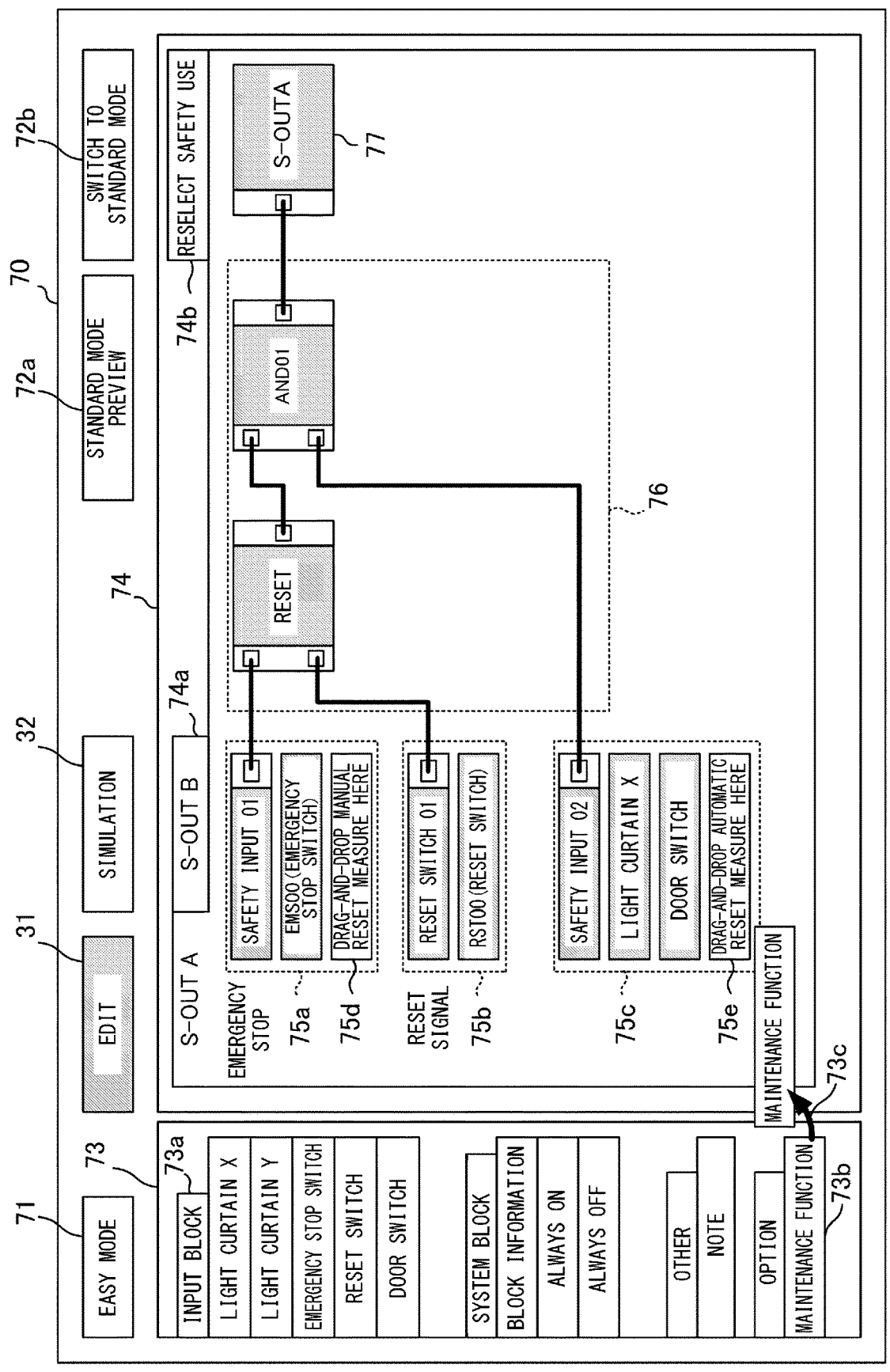
FIG. 7 is a diagram for describing a user interface.

FIG. 7 shows an edit screen 70 for creating the safety program in the EASY mode. The edit screen 70 is displayed, under the control of the CPU 13, on the display device 5b of the PC 2. On the edit screen 70, an unfinished safety program is presented in accordance with the safety use selected by the user for each safety output, and the program can be completed on a supplementary basis in a simplified procedure. That is, with a plurality of safety outputs registered, an unfinished safety program corresponding to each of the plurality of safety outputs may be provided. The unfinished safety program is a program in a state where functional blocks suitable for the selected safety use, and registered input blocks and output blocks are placed, the input and output between the blocks is connected, and no input device is assigned to each of the input blocks.

The edit screen 70 includes a display 71 indicating the EASY mode, an edit button 31, a simulation button 32, a standard mode preview button 72a, a standard mode switching button 72b, a list section (first area) 73, and a program creation area (second area) 74. In FIG. 7, with the edit button 31 selected, the unfinished safety program provided in the program creation area 74 is made editable. Creation of a program in the EASY mode is made by assigning input devices (replacing input blocks with input devices) for use in the safety system to be constructed from input devices displayed in the list section 73 to input blocks 75a to 75c in the program creation area 74. In the list section 73, input devices registered via the registration screen (not shown) are displayed in a selectable manner, and an item 73b for inserting a maintenance block for implementing the disabling function is further displayed as an option in a selectable manner. The user can drag-and-drop an input device 73a displayed in the list section 73 to a predetermined place in the program creation area 74 such as an add box 75d, 75e to assign the input device to an input block. When an input device is assigned to the add box 75d or 75e, another add box to which an input device can be assigned is displayed, thereby increasing the number of input devices to be assigned. When an input device is assigned to the add box 75d or 75e, a logical block that performs a logical operation on signals from a plurality of input devices assigned and outputs a result of the logical operation is inserted into an input block. Therefore, even when an input device is additionally inserted, the logical operation is internally performed in the input blocks 75a, 75c, thereby maintaining one output terminal as it is. Examples of the logical block include an AND block that performs a logical product operation or an OR block that performs a logical sum operation. It is needless to say that the logical block may be a block that performs a different logical operation. Basically, when all the input devices registered in the registration of input and output devices are assigned, the program is completed. Note that the input blocks such as the input blocks 75a, 75c to which safety input devices are assigned are basically configured to output a logical product of a plurality of input devices because a machine needs to be stopped when an error occurs at any place. On the other hand, when a reset signal is input as in the input block 75b, it is desirable that an add box for increasing the number of input devices be not provided from the viewpoint of safety.

The user can drag-and-drop the item 73b in the list section 73 to the program creation area 74, as shown by an arrow 73c, to insert a maintenance block for implementing the disabling function into the safety program currently being edited. An area to which the item 73b is dropped may be anywhere within the program creation area 74. As described above, when the maintenance block is inserted, a transition is made to a disabling method selection screen 80. The disabling method selection screen 80 will be described later with reference to FIG. 8.

The program creation area 74 is displayed for each registered output device. In the example shown in FIG. 7, as shown in tabs 74a, one output device (S-OUT A) is selected, and the program creation area for the output device is displayed. When another tab corresponding to another output device (S-OUT B) is selected from the tabs 74a, the program creation area for the output device is displayed. In the program creation area 74, an input block 75, a function block 76, and an output block 77 are displayed based on a predetermined placement relation, and input and output between the blocks is provided in a connected state (connected state). A reference numeral 74b denotes a button for reselecting a safety use for the safety output (for example, S-OUT A). When the button 74b is operated, a transition is made to a corresponding selection screen (not shown). This allows the user to select another safety use after confirming details of the unfinished safety program, thereby allowing a user-friendly operation system to be provided.

When the simulation button 32 is operated, the simulation of the safety program created as in the standard mode is executed as described with reference to FIG. 6 to allow the operation of the safety program to be checked. Note that, in the EASY mode, since the program is provided in a state where connections have already been checked, when an error occurs, the error lies in input device assignment. Examples of the error in input device assignment include a case where no assignment has been made and a case where an input device that is not recommended has been assigned to a predetermined block. When such an unrecommended input device is assigned, a corresponding error may be displayed when the user drag-and-drops the input device from the list section 73 to the program creation area 74 before the operation is checked, or alternatively, the input device may be prevented from being assigned.

When the standard mode preview button 72a is operated, a transition is made from the screen in the EASY mode to a screen for confirming a detailed block configuration and connection state as shown in the edit screen in the standard mode described with reference to FIG. 5. This screen allows only reference but not editing. On the other hand, when the standard mode switching button 72b is operated, the mode is switched from the EASY mode to the standard mode. Accordingly, a transition is made to a screen equivalent to the UI 30 shown in FIG. 5, allowing the user to freely connect and place blocks. Note that, once the transition to the standard mode is made, a transition back to the EASY mode is not allowed. This is because a change made to a connection or block in the standard mode may cause a change in optimal function block configuration provided in accordance with the safety use in the EASY mode. For example, allowing a transition back to the EASY mode may lead to a malfunction, which is not desirable from a safety point of view. Note that a policy with respect to such mode transitions may be changed under control in accordance with a user setting. Further, when editing is not made even after a transition to the standard mode, a transition back to the EASY mode may be made.

(Disabling Method Selection Screen)

Figure 8:
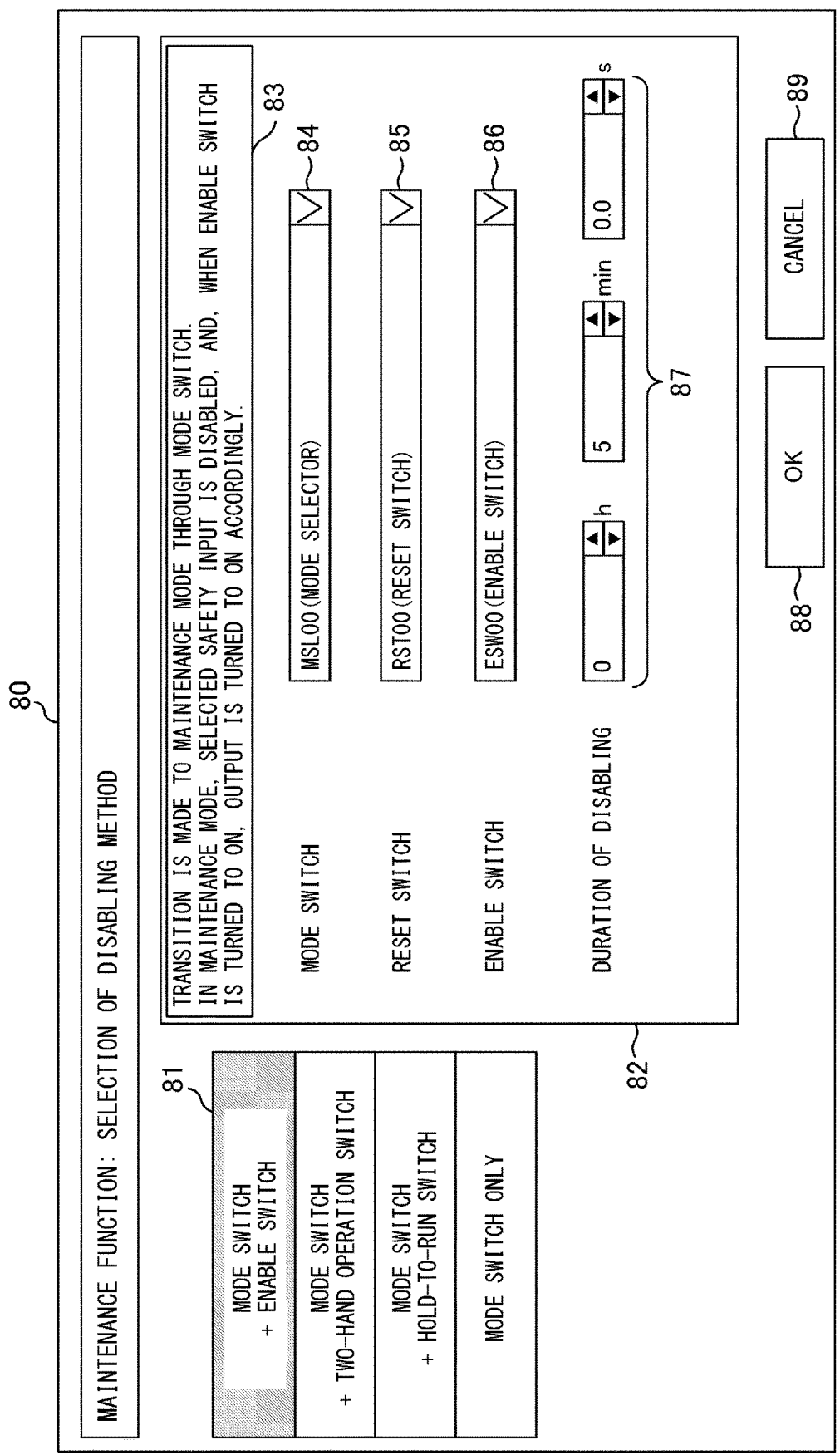
FIG. 8 is a diagram for describing a user interface.

FIG. 8 shows the disabling method selection screen 80 displayed when a disabling function is added via the edit screen 70. The selection screen 80 is displayed, under the control of the CPU 13, on the display device 5b of the PC 2. The disabling method is a method for switching between a normal mode in which the system (device) normally operates and a maintenance mode (manual mode) in which a predetermined safety input is forcibly determined to be ON and disabled. The selection screen 80 includes a list 81 for selecting a disabling method of the disabling function to be added, a setting area 82 for each selection item, an OK button 88, and a cancel button 89.

Figure 15:
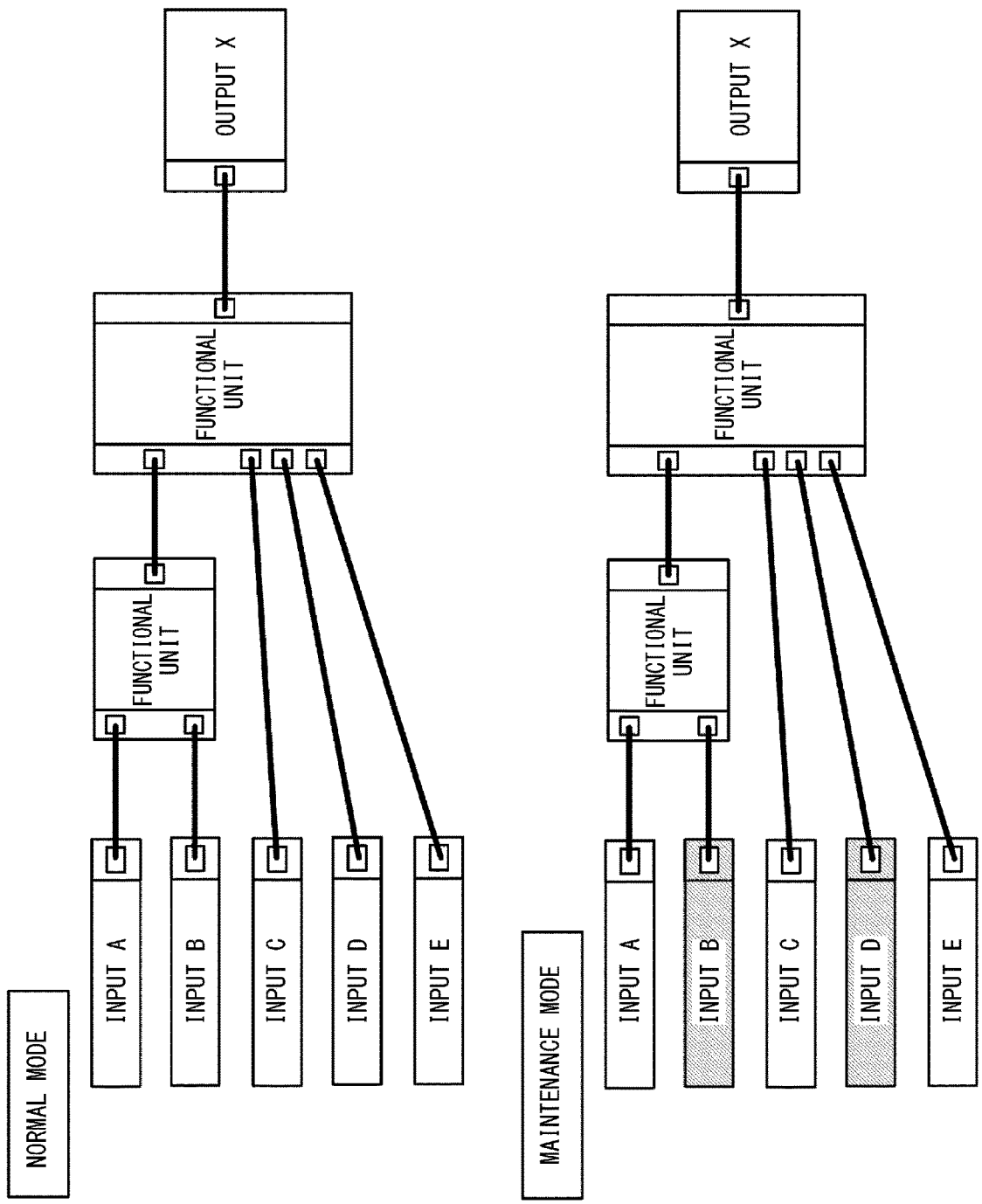
FIG. 15 is a diagram for describing a normal mode and a maintenance mode.

The normal mode and the maintenance mode will be described below with reference to FIG. 15. In a circuit configuration in the normal mode shown in FIG. 15, outputs of input blocks A to E are each connected to any one of input terminals of function blocks, and an output from the function blocks is connected to an input terminal of an output block. In the normal mode, a logic level of the safety output signal of the output block is switched through each function block in accordance with the safety input signal of the safety input device assigned as each input block. On the other hand, when the circuit configuration is represented at an EASY mode level, the circuit configuration for implementing the maintenance mode is the same as the circuit configuration in the normal mode. However, in the maintenance mode, the safety input signals of the input blocks B and D are disabled. Therefore, in this example, the safety input signals of the input blocks B and D are forcibly determined to be ON and do not affect the safety input signal of the output block X. Note that a description has been given of the fact that the circuit configuration is similarly represented at a display level corresponding to the EASY mode, but there is a difference in degree of detail from the circuit configuration in the standard mode. This is because, in comparison with the circuit configuration that supports only the normal mode, the configuration of the maintenance block (three functional blocks to be described later) for implementing the maintenance mode is added.

Returning to the description of FIG. 8. In the list 81, the disabling method of the disabling function to be added can be selected. As the disabling method, for example, a method using a mode switch and an enable switch, a method using the mode switch and a two-hand operation switch, a method using the mode switch and a hold-to-run switch, or a method using the mode switch only is selectable. Note that these methods are merely examples given for describing the present invention, and it is not intended to exclude the adoption of a different method. The above-described four methods are similarly controlled in a part where the mode switch switches between the normal mode and the maintenance mode, but are different in control of the safety output during the maintenance mode. Under the method using the mode switch only, the selected safety input is disabled, and the safety output is controlled to be ON.

Under the method using the mode switch and the enable switch, the selected safety input is disabled during the maintenance mode, and the safety output is controlled to be ON by turning the input of the enable switch to ON. A three-position switch is used as the enable switch based on ergonomic research. This switch is configured based on a result of ergonomic research that a button operator either releases a button or strongly holds the button when facing an emergency. Therefore, the three-position switch has three states for one stroke. The switch is turned to OFF when the operator releases the button, turned to ON when the operator presses the button lightly, and turned to OFF when the operator presses the button strongly. That is, the safety output of the safety system is turned to ON only when the operator presses the button lightly, and in other cases, the safety output is turned to OFF. For example, when a worker accesses a robot work area, the safety output is switched to OFF to bring a robot to a stop because a safety input of a safety component that detects the opening of a safety door is OFF, thereby securing the safety of the worker. However, when the enable switch is pressed lightly, the safety switch is switched from OFF to ON, and even if the worker enters the robot work area, it is possible to inspect or check the work area without turning the safety output to OFF.

Under the method using the mode switch and the two-hand operation switch, the selected safety input is disabled during the maintenance mode, and the safety output is controlled to be ON by turning the input of the two-hand operation switch to ON. The two-hand operation switch is a switch that allows the worker to turn the safety output to ON by operating the switch with his/her right and left hands placed at predetermined positions. This prevents an occurrence of a case where, for example, when the switch is operated with one hand, and the other hand enters a hazardous area, the safety output is turned to ON, thereby securing the safety of the worker.

Under the method using the mode switch and the hold-to-run switch, the selected safety input is disabled during the maintenance mode, and the safety output is controlled to be ON by turning the input of the hold-to-run switch to ON. The hold-to-run switch is a switch that causes a system to operate while the worker continues to activate a manual switch, lever, or the like. When the worker release his/her hand or finger from the switch or lever, a corresponding device is immediately brought to a stop. Therefore, since the device is immediately brought to a stop when a hand is released from the switch, safety in an emergency can be secured.

The setting area 82 includes a description 83 of the disabling method for each selected item, and displays 84 to 87 for making various settings. In the example shown in FIG. 8, the list 81 shows a state where the method using the mode switch and the enable switch is selected, and the setting area 82 also corresponds to the method. In the description 83, a description of details of control of each disabling method described above is displayed. The display 84 is a setting area for selecting a type of mode switch. The display 85 is a setting area for selecting a type of reset switch. The display 86 is a setting area for selecting a type of enable switch. Note that, in order to select the type of each switch, operating pull-down button causes a selectable type to be displayed, for example. Further, detailed settings of each switch may be made by a predetermined operation on each display, for example, by a predetermined operation using a pointing device with a corresponding pointer superimposed on each display. When the above-described predetermined operation is performed on the display 84, a transition is made to a mode switch detailed setting screen 90 shown in FIG. 9. Details of the detailed setting screen will be described later with reference to FIGS. 9 and 16.

The display 87 is a setting area that allows the upper limit of duration of disabling to be set in units of seconds. When the maintenance mode continues beyond the duration of disabling thus set, the safety output is turned to OFF, and the system is brought into an error state. Note that the duration of disabling has a configurable range, and can be set, for example, in a range of 1 second to 12 (hours).

Figure 9:
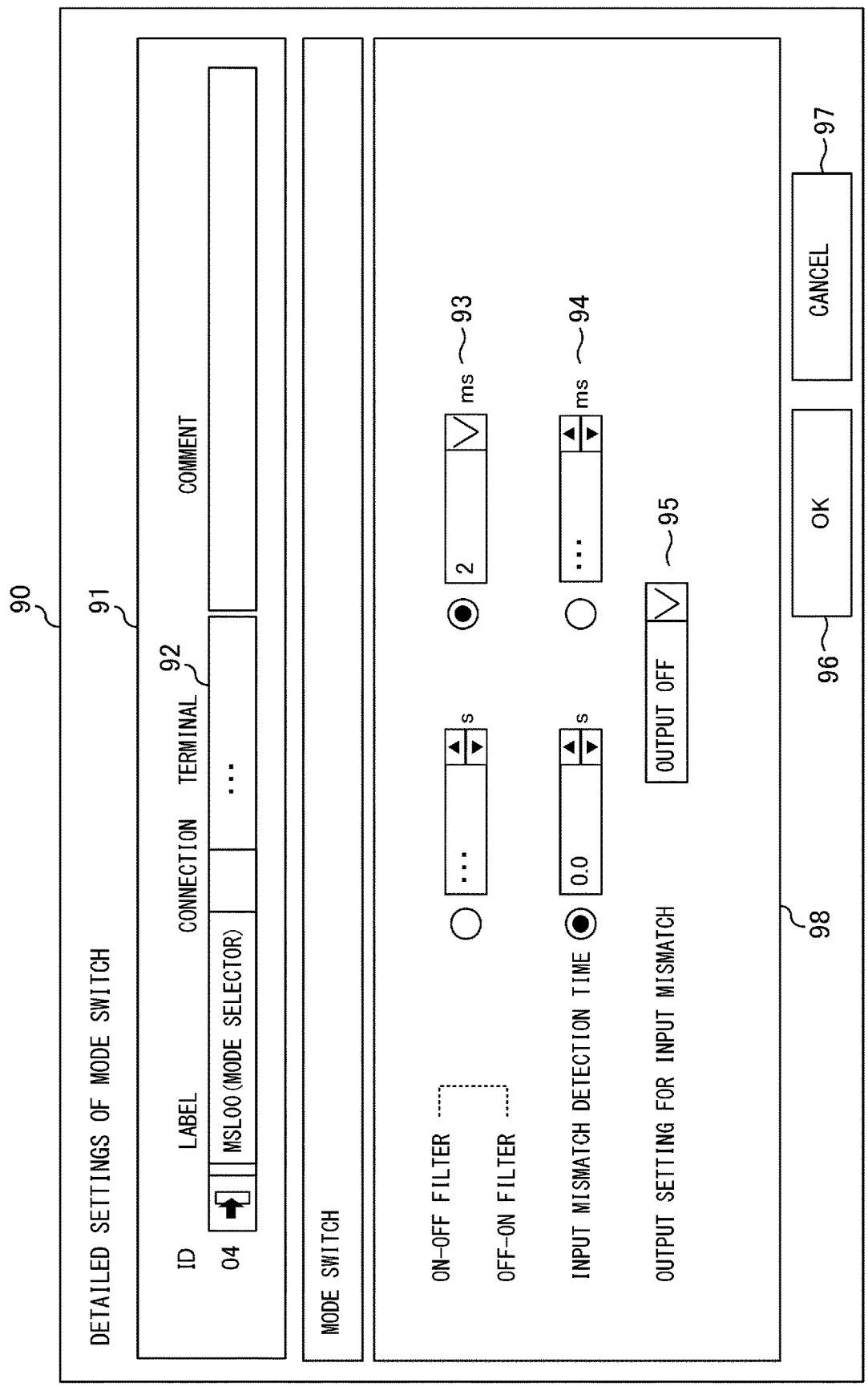
FIG. 9 is a diagram for describing a user interface.
Figure 10:
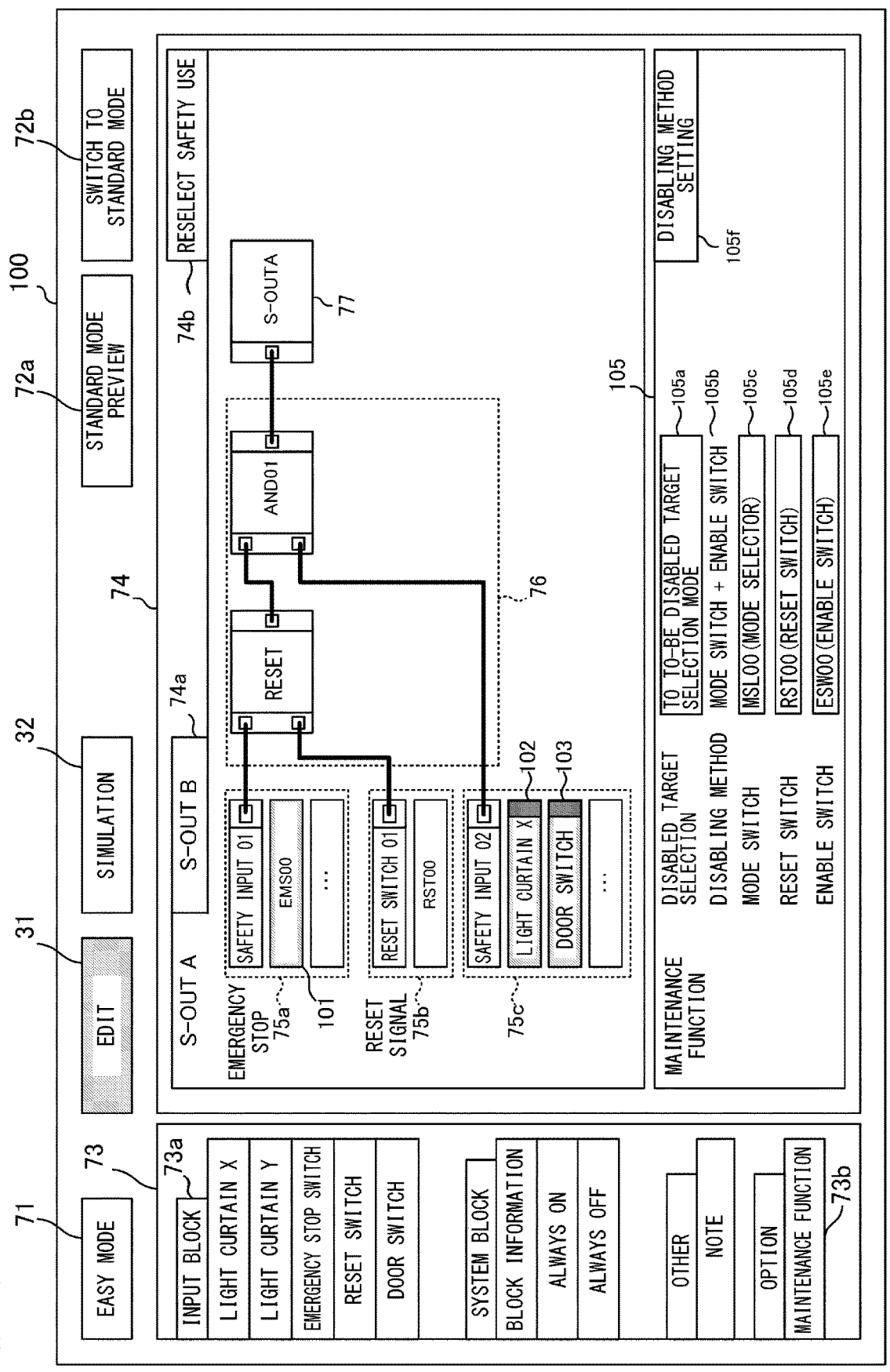
FIG. 10 is a diagram for describing a user interface.

When the OK button 88 is operated with any one of the disabling method items in the list 81 selected, the disabling method is determined, and a transition is made to the screen shown in FIG. 9 or FIG. 10. For example, when there is a necessary setting item, a transition is made to the detailed setting screen 90 shown in FIG. 9. On the other hand, when there is no other particular setting item, a transition is made to an edit screen 100 shown in FIG. 10. Such display control may be dependent on the selected disabling method or may be dependent on a system specification or the like. When the cancel button 89 is operated, a transition is made back to the screen, such as the edit screen 70, displayed before the transition to the selection screen 80.

(Detailed Setting Screen)

FIG. 9 shows the detailed setting screen 90 for switches and the like used in the disabling function. The detailed setting screen 90 is displayed, under the control of the CPU 13, on the display device 5b, and allows various parameters of switches and the like to be set in accordance with user input. Note that the detailed setting screen 90 shown in FIG. 9 is an example, and various detailed setting screens may be displayed in a manner that depends on each switch and the like. The detailed setting screen 90 includes a connection setting area 91 for a mode switch serving as the safety input device, a parameter setting area 98, an OK button 96, and a cancel button 97. In the connection setting area 91, an identifier of a selected switch, a label, a setting area for assigning a terminal for connection to the main module, a comment, and the like are displayed. The setting area allows the user to set a terminal for connection of the switch to the main module.

In the parameter setting area 98, various parameter setting areas 93 to 95 are displayed. In the setting area 93, a filter time when the safety input signal is turned from ON to OFF or from OFF to ON can be set in units of seconds or milliseconds. In the setting area 94, a time during which detection of an input mismatch is made when a dual-redundant signal is used can be set. In the setting area 95, a logic level of the safety output at the time of input mismatch can be set. When the OK button 96 is operated, the set parameters and the like are finalized, and a transition is made to another detailed setting screen or the edit screen 100 shown in FIG. 10. On the other hand, when the cancel button 97 is operated, the set parameters and the like are discarded, and a transition is made back to the screen displayed before the transition to the detailed setting screen 90.

Figure 16:
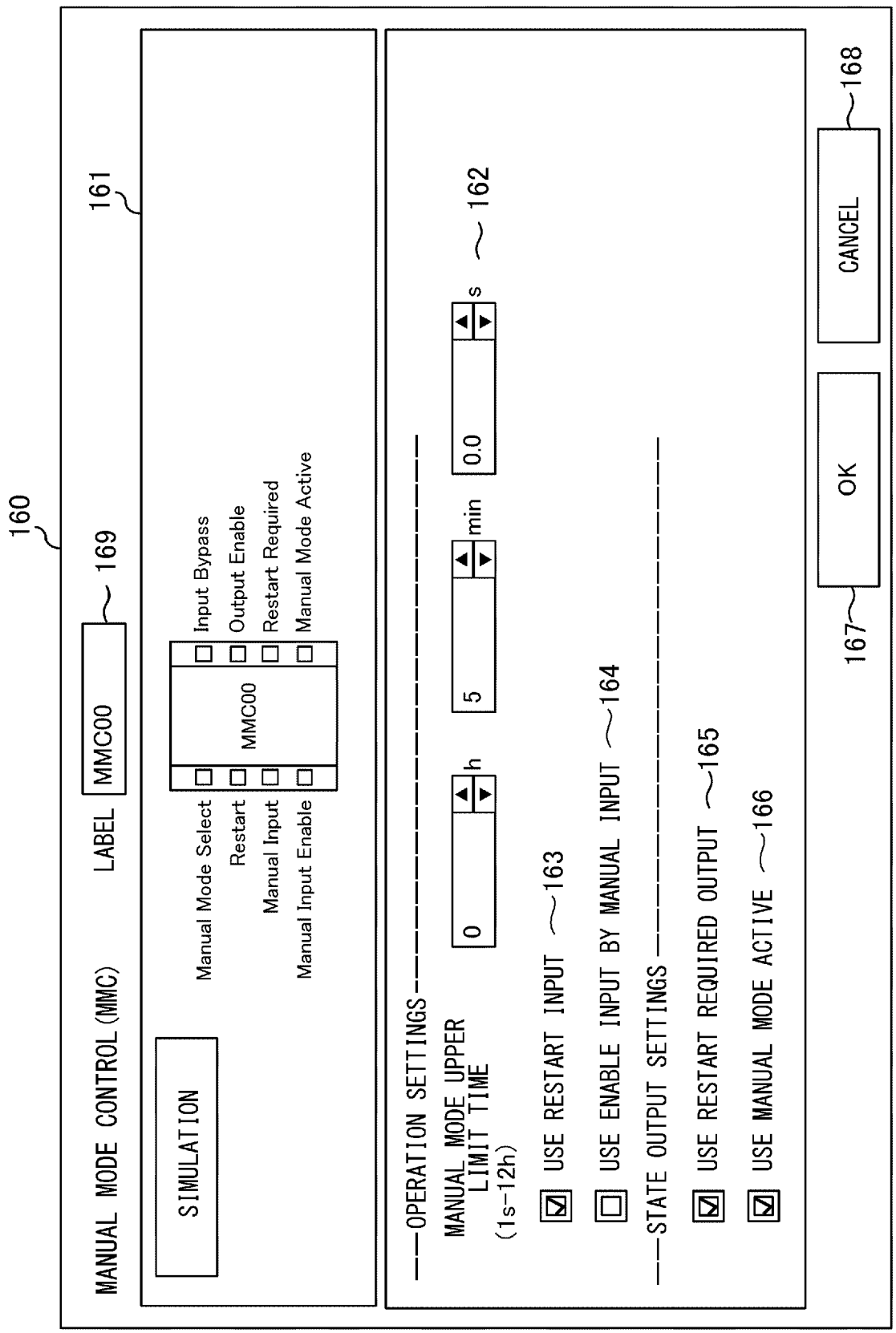
FIG. 16 is a diagram for describing a user interface.

FIG. 16 shows a detailed setting screen 160 for a block included in the maintenance block that controls the maintenance mode (manual mode). The detailed setting screen 160 corresponds to the detailed setting screen for a manual mode control block 1101 to be described later. Note that a transition to the detailed setting screen 160 may be made through a predetermined operation (for example, right-clicking a mouse) on the function block 76 in the edit screen 100 to be described later or a block (MMC00) corresponding to a standard mode level shown in FIG. 11 to be described later. The detailed setting screen 160 allows detailed settings of the function block that implements the added disabling function to be made. The detailed setting screen 160 includes a simulation area 161, displays 162 to 166 related to various detailed settings, an OK button 167, a cancel button 168, and a label 169.

In the simulation area 161, a corresponding function block is displayed, and the operation of the block can be individually checked. For example, operating each input terminal with a pointing device or the like allows a logical state to be switched between ON and OFF. The user can check the operation in the maintenance mode based on the simulation. The label 169 is a label assigned to the block and is displayed in a changeable manner.

Each input terminal shown in FIG. 16 will be described below. A signal for enabling the manual mode is input to a "Manual Mode Select" input terminal. A signal for returning to the normal mode at the end of the manual mode is input to a "Restart" input terminal. A signal from the enable switch is input to a "Manual Input" input terminal. A signal for enabling the input is input to a "Manual Input Enable" input terminal. An "Input Bypass" output terminal is connected to an input disabling block that is one of the functional blocks making up the maintenance block. Details of the input disabling block will be described later with reference to FIG. 11. An "Output Enable" output terminal is connected to an output permission block. Details of the output permission block will be described later with reference to FIG. 11. A "Restart Required" output terminal outputs a signal indicating that it is waiting for restart. The restart while this signal is ON can terminate the manual mode. A "Manual Mode Active" output terminal is a signal that is turned to ON while the output in the manual mode is permitted.

Displays 162 to 164 are setting areas for making settings related to operation settings of the block. The display 162 is a setting area that allows the duration of disabling (manual mode upper limit time) to be set. The display 163 is a setting area that allows a setting of whether to use a restart input. With an item of the display 163 set, even when the signal "Manual Mode Select" for returning to the normal mode at the end of the manual mode is turned to OFF, the output of the output permission block is maintained OFF until the restart input is given. The display 164 is a setting area that allows a setting of whether to use an enable input by manual input. When an item of the display 164 is set, the "Manual Input" is enabled only while the "Manual Input Enable" is ON. The displays 165 and 166 are setting areas for setting the state output, and the display 165 is a setting area that allows a setting of whether to use a restart required output. In the example shown in FIG. 16, an item of the display 165 is set, and in this case, the "Restart Required" output terminal is added to the function block displayed in the simulation area 161. The restart required output is a signal indicating that it is waiting for restart, and the restart while the signal is ON terminates the manual mode. The display 166 is a setting area that allows a setting of whether to use an active function in the maintenance mode. In the example shown in FIG. 16, an item of the display 166 is set, and in this case, the "Manual Mode Active" output terminal is added to the function block displayed in the simulation area 161. Enabling the active function allows a reduction in operating speed of a machine such as a robot as compared with during the normal time. This allows the worker to perform work such as lubricating after operating the enable switch or the like to put the machine into operation (for a short time) to change the position of the machine. Note that these setting items are examples and are not intended to limit the present invention. When the OK button 167 is operated with these settings made, the various settings are determined. On the other hand, when the cancel button 168 is operated, these settings are discarded, and the setting state before the change is maintained.

(Edit Screen After Disabling Function is Added)

FIG. 10 shows the edit screen 100 after the disabling function is added. Differences from the edit screen 70 shown in FIG. 7 will be mainly described. The same components are denoted by the same reference numerals, and no description will be given of such components. The edit screen 100 is displayed, under the control of the CPU 13, on the display device 5b, and, on the edit screen 100, in addition to the components of the edit screen 70 described with reference to FIG. 7, a maintenance function display area 105 is displayed.

In the display area 105, displays 105a to 105e, and a disabling method setting button 105f are displayed. The display 105a is a setting area where a switch to a to-be disabled target selection mode is made. The edit screen 100 shown in FIG. 10 shows a state where a switch to the to-be disabled target selection mode is set and is in transition. The to-be disabled target selection mode is a mode for selecting a safety input device to be disabled. In this mode, an input block corresponding to a selectable safety input device is highlighted in the program creation area 74, and the user can select a safety input device to be disabled by selecting at least one highlighted input block. The highlighted display may be any display, and is a display with shading applied in the example shown in FIG. 10. For example, the display with shading applied may be different in color from other blocks. Further, the highlighted display may be a blinking display or a display surrounded by thick lines. The program creation area 74 shown in FIG. 10 shows that "light curtain X" and "door switch" are set as safety input devices to be disabled. Displays 102, 103 showing that their respective blocks have been set as safety input devices to be disabled are displayed in their respective blocks.

As described above, according to the present embodiment, in order to add the maintenance mode to the safety program being created, the user drag-and-drops an optional maintenance function 73b to the program creation area 74 and then selects a disabling method. Furthermore, the maintenance block that implements the disabling function can be easily inserted into the safety program by selecting the safety input device to be disabled.

The display 105b shows the disabling method selected via the selection screen 80. The disabling method can be reset through operation of the setting button 105f. The displays 105c to 105e correspond to the displays 84 to 86 shown in FIG. 8 and are display areas for various switch types and detailed settings. In the display example shown in FIG. 10, the contents set on the selection screen 80 shown in FIG. 8 are displayed by default. Such displayed settings can be changed in the same manner as on the selection screen 80.

Further, when the simulation button 32 is operated after the disabling function is added, the operation check can be made while switching between the normal mode and the maintenance mode by a selection button (not shown) or the like. On this simulation screen, each time each of at least one safety input device assigned to an input block to be displayed is designated in accordance with user input, the operation check can be made while switching between ON and OFF of the input signal of a corresponding input device. In this case, in the display area 105, a mode switching selection button or the like may be displayed. Further, during the simulation, it is desirable to display the ON/OFF of each switch of the displays 105c to 105e in a distinguishable manner.

(Addition of Disabling Function in Standard Mode)

Figure 11:
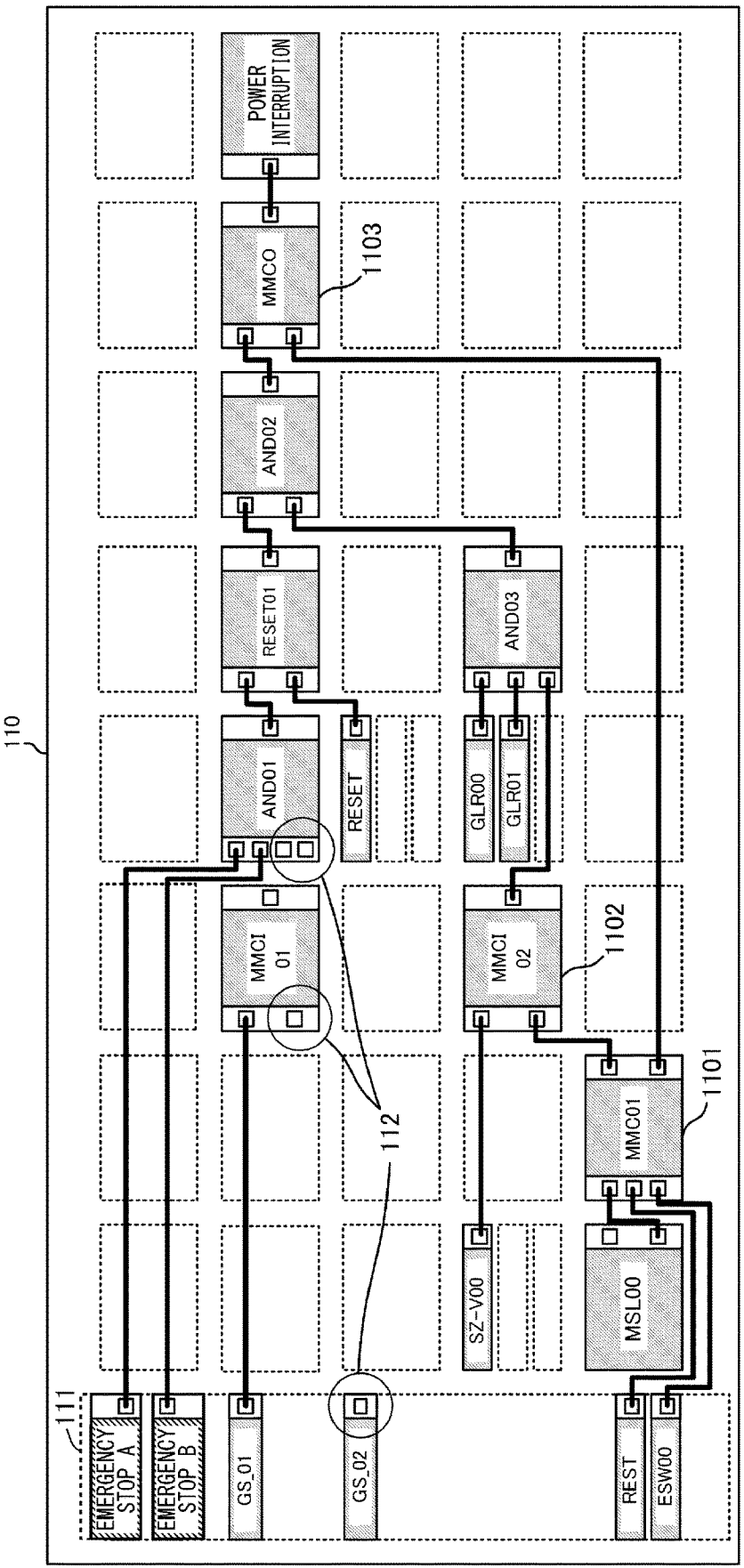
FIG. 11 is a diagram showing maintenance blocks in the form of a circuit configuration in a standard mode.

FIG. 11 shows a circuit configuration at the standard mode level when the disabling function is added. A case where the disabling function is added in the standard mode will be briefly described below. Note that the circuit configuration shown in FIG. 11 is a circuit configuration that can be displayed in the program creation area when the standard mode preview button 72a or the standard mode switching button 72b on the edit screen 100 shown in FIG. 10 is operated. Further, when the disabling function is created in the standard mode, the same display as shown in FIG. 11 is provided. Note that the circuit configuration shown in FIG. 11 is merely an example, and does not correspond to the circuit configuration shown in FIG. 10 where the disabling function is added. Further, the circuit configuration shown in FIG. 11 is an unfinished safety program, and is, for example, in a state where a safety input device to be disabled and an input terminal of a function block are not connected as denoted by a reference numeral 112.

A functional block that implements the disabling function will be described below with reference to FIG. 11. The disabling function is implemented by, for example, the following three functional blocks. That is, in the example shown in FIG. 11, the disabling function is implemented by the three functional blocks, the manual mode control block 1101, an input disabling block 1102, and an output permission block 1103. The manual mode control block 1101 outputs a disabling signal or an output permission signal based on a mode switching input (input from "MSL00" in FIG. 11), an input from an enable switch ("ESW00" in FIG. 11), and a reset signal. The input disabling block 1102 disables the signal (for example, always turns the signal to ON regardless of a logic level of the signal) input from the safety input device ("SZ-V00" in FIG. 11) in accordance with the disabling signal from the manual mode control block 1101. The output permission block 1103 switches between enabling and disabling the output in accordance with the output permission signal from the manual mode control block 1101.

A disabling procedure in the circuit configuration shown in FIG. 11 will be described. First, the mode switching switch is turned to ON to enable the manual mode (disabling function). Specifically, the disabling signal is input from the manual mode control block 1101 to the input disabling block 1102 to disable the signal from the safety input device. Subsequently, when the enable switch is turned to ON, the output permission signal is input from the manual mode control block 1101 to the output permission block 1103. In this state, the output from the output permission block 1103 is turned to ON. Then, when the mode switching switch is turned to OFF, and the reset switch is turned to ON, the manual mode control block 1101 terminates the manual mode.

As shown in FIG. 11, in order to add the disabling function in the standard mode, it is necessary to manually place each block, select the target to be disabled, and connect the input and output between the blocks. Setting up such circuit configurations so as to meet a safety standard recommended by standards or the like requires highly specialized technical knowledge, which makes the work complicated as compared with the work in the EASY mode. In the EASY mode, such a complicated work can be performed in a simplified procedure by adding the disabling function through operation such as selection of the disabling method, various detailed settings, and selection of the safety input device to be disabled. On the other hand, when the disabling function is added in the standard mode, there is an advantage that a degree of freedom in creating a program is considerably higher than in the EASY mode. Therefore, it is possible to further increase usability by providing an operation system that allows the disabling function to be added in these two modes.

<Flowchart>

Figure 12:
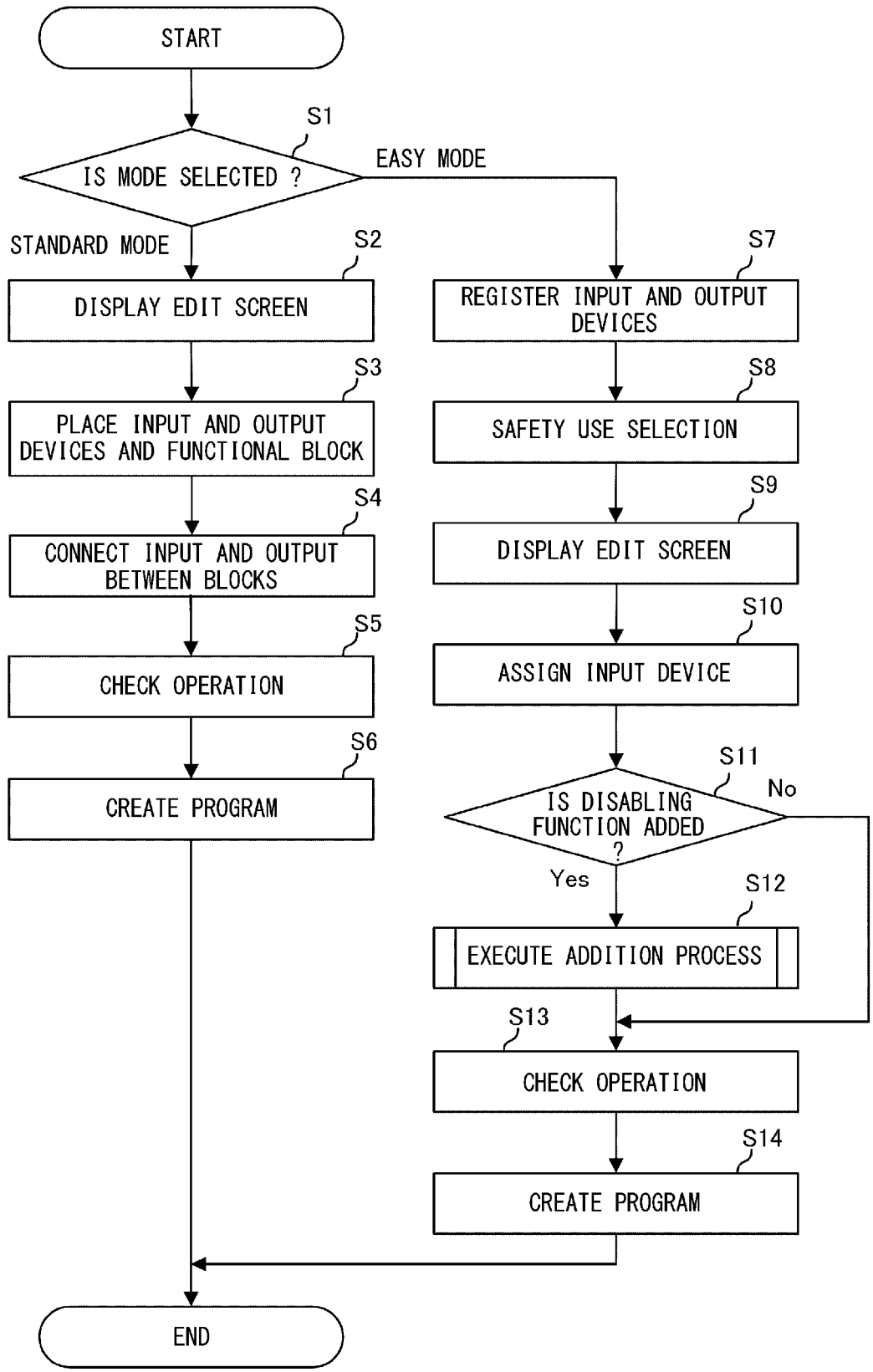
FIG. 12 is a diagram for describing a flowchart of creation of a safety program.

FIG. 12 is a flowchart showing a processing procedure of the PC 2 serving as the program creation assistance device when the safety program including the disabling function is created.

In S1, the CPU 13 displays, on the display device 5b, a selection screen (not shown) where the programming mode is selected and determines which mode has been selected in response to user input. Herein, when the standard mode is selected, the process proceeds to S2, and when the EASY mode is selected, the process proceeds to S7.

When the standard mode is selected, the CPU 13 displays the edit screen of the UI 30 shown in FIG. 4 on the display device 5b in S2. Subsequently, in S3 and S4, the CPU 13 receives and edits, in accordance with a user operation, placement of input and output blocks (input and output devices) and function blocks and input and output connections between the placed blocks. Herein, in order to implement the disabling function in the standard mode, the user needs to configure the function blocks and the like by him or herself. For example, as described with reference to FIG. 11, the user places the three functional blocks (maintenance blocks), the manual mode control block 1101, the input disabling block 1102, and the output permission block 1103, connects the blocks, and makes detailed setting of each functional block as described with reference to FIG. 16.

Note that, for convenience sake, S3 and S4 are shown in this order, but may be executed in any order in accordance with a user operation. That is, the connections need not necessarily be made after all blocks are placed, and may be made in any order. Furthermore, S3 and S4 including S5 to be described later may be executed in any order. Next, in S4, the CPU 13 executes the simulation when the simulation button 32 is pressed as described with reference to FIG. 6 to make the operation check under the created block configuration. When the operation check has been successfully made, the CPU 13 creates a safety program based on the block configuration and connection state in S6, and brings the process to an end. Note that the created safety program is transferred to and executed by the main module 3 serving as the main controller.

On the other hand, when the EASY mode is selected, the CPU 13 displays the registration screen (not shown) on the display device 5b in S7, and registers, in accordance with user input, input and output devices for use in the safety system to be constructed. Subsequently, in S8, the CPU 13 selects a safety use (application) for each registered output device (output terminal) in accordance with user input. When the safety use is selected, in S9, the CPU 13 displays, on the display device 5b, the edit screen 70 as shown in FIG. 7 where editing can be made for each registered output device. The edit screen displayed herein is provided in a state where predetermined connections are made between blocks that make up the unfinished safety program held in advance in accordance with the selected safety use. Subsequently, in S10, the CPU 13 assigns, in accordance with user input, an unassigned input device. The above-described processes in the EASY mode correspond to a procedure for creating a normal safety program including no disabling function. Note that an addition process of adding the disabling function to be described later may be executed at any timing after the edit screen 70 is displayed in S9. Herein, in order to make the description simple, a processing procedure in which input devices are assigned first will be described.

In S11, the CPU 13 determines whether a disabling function addition operation has been performed. As described above, the addition operation corresponds to the user input where the optional maintenance function 73b is dragged and dropped to the program creation area 74 on the edit screen 70, for example. It is needless to say that a different operation may be accepted as the addition operation. When the addition operation is performed, CPU 13 proceeds to S12, executes the addition process, and then proceeds to S13. Details of the addition process will be described later with reference to FIG. 13. On the other hand, when no addition operation is performed, the CPU 13 proceeds to S13 without adding the disabling function.

In S13, the CPU 13 performs the operation check on the safety program to which input devices have been assigned. When the disabling function has been added in S12, the operation check can be made while switching between the normal mode and the maintenance mode. After the operation check, in S14, the CPU 13 supplements the unfinished safety program based on the input devices assigned in the EASY mode and the added disabling function to complete the program, and brings the process to an end. Note that the created safety program is transferred to and executed by the main module 3 serving as the main controller.

Figure 13:
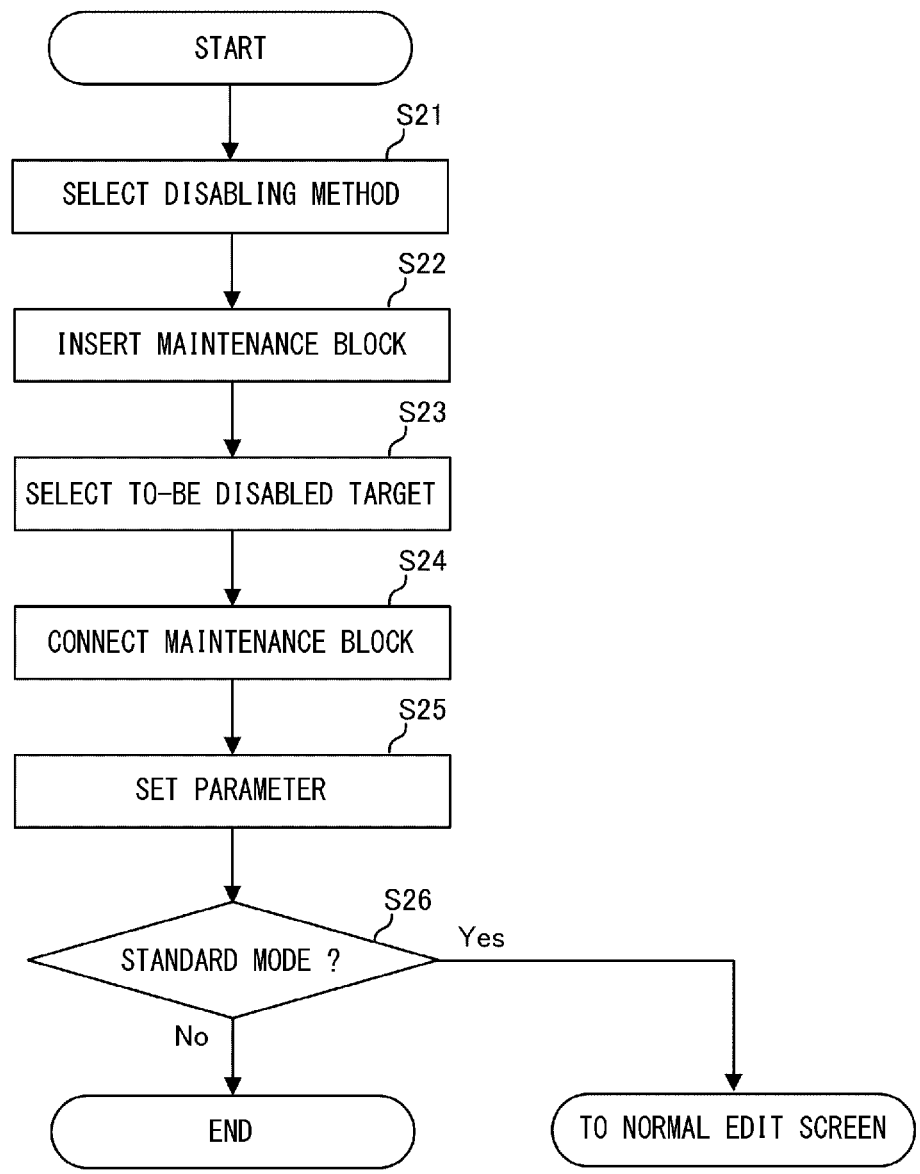
FIG. 13 is a diagram for describing a flowchart of creation of the safety program.

FIG. 13 is a flowchart showing a detailed processing procedure for the addition process of adding the disabling function in S12 shown in FIG. 12.

In S21, the CPU 13 displays the disabling method selection screen 80 shown in FIG. 8 on the display device 5b, receives user input via the selection screen 80, and selects the disabling method to be added to the safety program being edited. Subsequently, in S22, the CPU 13 inserts the maintenance block that implements the disabling function based on the information acquired from the disabling function information 17 in the storage device 15, in accordance with the selected disabling method. Herein, when there is an input block (safety input device) missing in the safety program being edited, it is desirable to additionally insert the input block. For example, when the enable switch is required but is not assigned as an input block, the enable switch may be assigned automatically.

Next, in S23, when the to-be disabled target selection mode is set, the CPU 13 selects a safety input device to be disabled in accordance with user input. Subsequently, in S24, the CPU 13 connects the input and output between the maintenance block and the input block or the output block inserted as required. S24 is not always executed, and each block may be provided to the user with the input and output between the blocks already connected. In such a case, S24 is skipped. In S25, the CPU 13 sets various parameters of the disabling function, each block, each switch, and the like in accordance with user input. The description of S23 to S25, and S26 and S27 (to be described later) has been given on the assumption that, in order to make the description simple, S23 to S25, and S26 and S27 are executed in a predetermined order for the sake of convenience, but practically, these processes are executed in any order in accordance with user input.

In S26, the CPU 13 determines whether the standard mode switching button 72*b* is operated to request a transition to the standard mode. When the transition to the standard mode is requested, a transition is made to the standard mode edit screen as shown in the UI 30 in FIG. 5, and the process is brought to an end. On the other hand, when the transition to the standard mode is not requested, the process is returned to the flowchart shown in FIG. 12, and proceeds to the process (S13) of making the operation check on the safety program to which the disabling function has been added while switching between the normal mode and the maintenance mode.

<Function of CPU>

Figure 14:
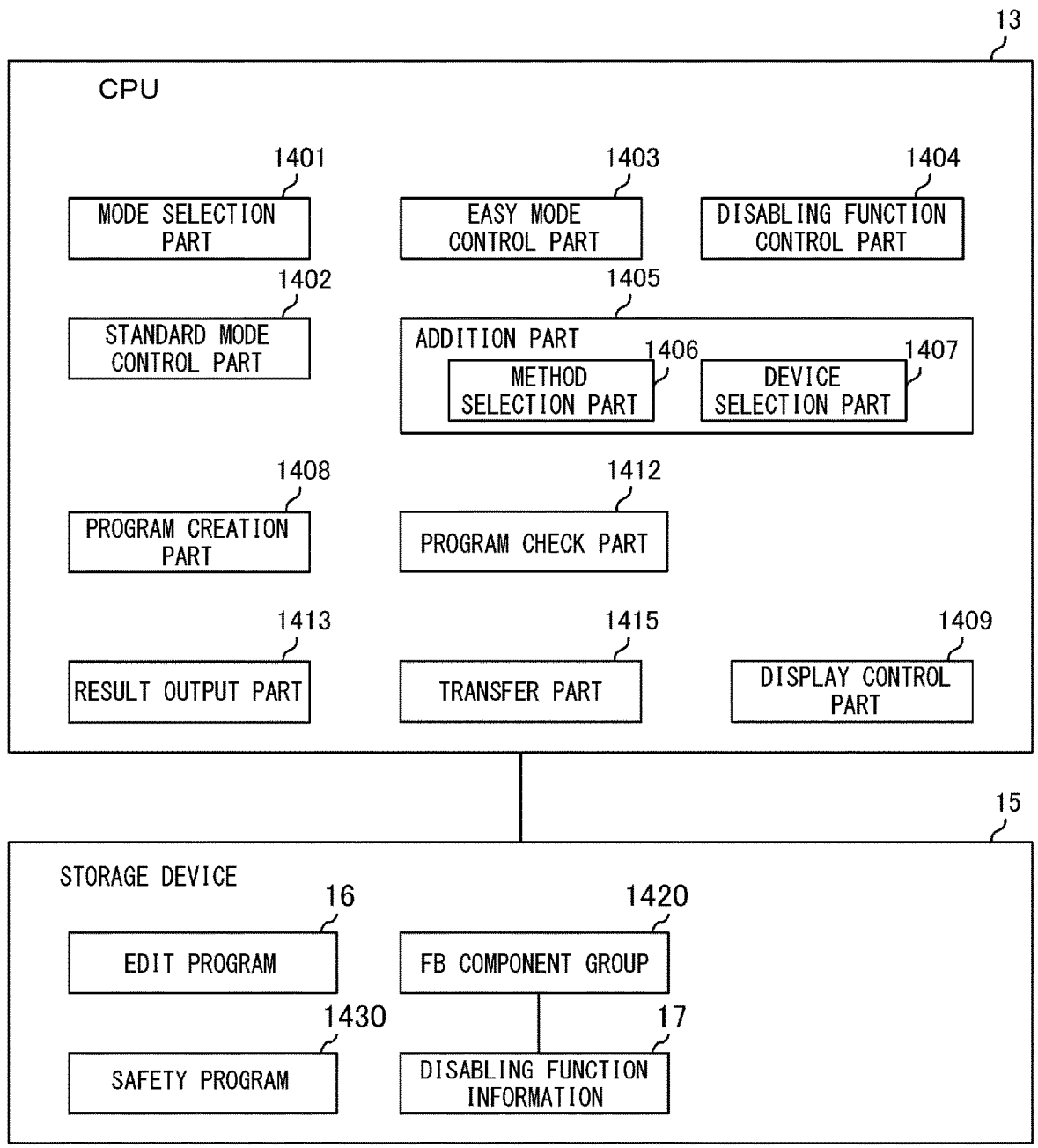
FIG. 14 is a diagram for describing functions of a CPU.

FIG. 14 shows various functions implemented via the edit program 16 executed by the CPU 13. The CPU 13 includes, as functional components, a mode selection part 1401, a standard mode control part 1402, an EASY mode control part 1403, a disabling function control part 1404, an addition part 1405, a program creation part 1408, a display control part 1409, a program check part 1412, a result output part 1413, and a transfer part 1415. The addition part 1405 includes a method selection part 1406 and a device selection part 1407.

The mode selection part 1401 selects the programming mode in accordance with user input via a mode selection screen (not shown). The standard mode control part 1402 performs various types of control when the safety program is edited (created) in the standard mode using, for example, the edit screen described with reference to FIG. 4 to FIG. 6 and the like.

The EASY mode control part 1403 performs control when the safety program is edited (created) in the EASY mode. The disabling function control part 1404 controls, when the disabling function is added, the execution of the disabling function. The addition part 1405 performs control to insert the maintenance block into the safety program being edited when the addition of the disabling function is instructed. More specifically, the addition part 1405 causes the method selection part 1406 to select the disabling method of the disabling function to be added in accordance with user input via the selection screen 80, acquires a maintenance block corresponding to the selected disabling method from the disabling function information 17 stored in the storage device 15, and inserts the maintenance block into the safety program. Further, the device selection part 1407 selects the safety input device to be disabled in accordance with user input in the to-be-disabled target selection mode.

The display control part 1409 control the display device 5*b* to display various screens. A user operation made on each screen is transmitted to a corresponding functional part. For example, the user operation input via the selection screen 80 is transmitted to the method selection part 1406. The program creation part 1408 creates a program edited by each of the standard mode control part 1402 and the EASY mode control part 1403. The program check part 1412 checks the operation of the program edited in each mode. In the standard mode, each placed block and input and output connection between the blocks are checked. In the EASY mode, assignment of an input device to an input block and the like are checked. The result output part 1413 displays an execution screen of full simulation or partial simulation (FIG. 6 and the like). The transfer part 1415 transfers a completed safety program 1430 to the main module 3.

The storage device 15 stores at least the edit program 16, an FB component group 1420, the safety program 1430, and information on safety use 1440. The edit program 16 is executed by the CPU 13 to enable each functional part to operate, as described above. The FB component group 1420 includes information on function blocks for use in list display when a functional block is placed in the standard mode. Further, in the FB component group 1420, pieces of information on function blocks included in an unfinished safety program in accordance with a safety use selected in the EASY mode are stored in association with each other. The safety program 1430 includes information on an unfinished safety program for each safety use in addition to the edited and completed safety program. The disabling function information 17 includes, for each safety use, selection information for use in selection, by the user, of a safety use, and placement information and connection information on functional blocks and input and output blocks (input and output devices) suitable for the selected safety use, and the like.

<Summary>

The PC 2 serves as the program creation assistance device that assists in creation of the safety program to be executed by the safety controller. The safety controller system 1 and the main module 3 are examples of the safety controller. The program creation part 1408 creates the safety program including an input block to which a safety input signal from an input device is assigned and a functional block that implements a safety function. The addition part 1405 adds, to the safety program created, a plurality blocks and connections between the plurality of blocks in accordance with an instruction from a user, the plurality of blocks and the connections between the plurality of blocks being configured to implement a disabling function that disables the safety input signal when a predetermined condition is satisfied in the safety program. The user may drag-and-drop a display item representing the disabling function to a program creation area on an edit screen for the safety program to provide the instruction. As described above, the program creation assistance device according to the present invention can add the disabling function that satisfies a safety standard to the safety program in a simplified procedure. Therefore, the user can add the disabling function to the safety program in a fallen manner without any technical knowledge for implementing the disabling function.

The addition part 1405 includes the method selection part 1406 that selects a disabling method of the disabling function in accordance with user input. The addition part 1405 further includes the device selection part 1407 that selects an input device to which the disabling function is applied in accordance with user input. The device selection part 1407 selects, as the input device to which the disabling function is applied, a device designated in accordance with user input from among input devices assigned to input blocks included in the safety program on an edit screen where the safety program created is made editable. On the edit screen, the input device selected as the input device to which the disabling function is applied may be displayed in a distinguishable manner. As described above, the user can add the disabling function to the safety program in a simplified procedure.

The program check part 1412 makes the operation check while switching between the normal mode in which the disabling function added is disabled and the maintenance mode in which the disabling function is enabled. Each time each of at least one input device assigned to an input block displayed on a simulation screen is designated in accordance with user input, the operation check may be made while switching between ON and OFF of an input signal of a corresponding input device. As described above, according to the present invention, it is possible to make, in a simplified manner, the operation check on the disabling function added.

The program creation assistance device has the standard mode (first mode) that allows programming in a detailed manner and the EASY mode (second mode) that allows programming in a simplified manner as compared with the first mode. The addition part 1405 adds the disabling function to a safety program created in the second mode. Note that the disabling function added in the EASY mode allows a maintenance block that satisfies a predetermined safety standard to be added, and thus the user can add the disabling function in a simplified manner without any technical knowledge. It is needless to say that the disabling function can be added in the first mode, which allows the user to freely make a design.

The invention is not limited to the above-described embodiment, and various modifications or changes may be made within the scope of the invention.

What is claimed is:

1. A program creation assistance device that assists in creation of a safety program to be executed by a safety controller, the program creation assistance device comprising:
    a creation unit that creates the safety program including an input block to which a safety input signal from an input device is assigned and a functional block that implements a safety function;
    an addition unit that adds, to the safety program created by the creation unit, a plurality of blocks and connections between the plurality of blocks in accordance with an instruction from a user, the plurality of blocks and the connections between the plurality of blocks being configured to implement a disabling function that disables the safety input signal when a predetermined condition is satisfied in the safety program; and
    the addition unit includes a method selection unit that selects a disabling method of the disabling function in accordance with user input.

2. The program creation assistance device according to claim 1, wherein the addition unit further includes a device selection unit that selects an input device to which the disabling function is applied in accordance with user input.

3. The program creation assistance device according to claim 2, wherein the device selection unit selects, as the input device to which the disabling function is applied, a device designated in accordance with user input from among input devices assigned to input blocks included in the safety program on an edit screen where the safety program created by the creation unit is made editable.

4. The program creation assistance device according to claim 3, wherein, on the edit screen, the input device selected by the device selection unit as the input device to which the disabling function is applied is displayed in a distinguishable manner.

5. The program creation assistance device according to claim 1, further comprising a simulation unit that makes an operation check while switching between a normal mode in which the disabling function added by the addition unit is disabled and a maintenance mode in which the disabling function is enabled.

6. The program creation assistance device according to claim 5, wherein each time each of at least one input device assigned to an input block displayed on a simulation screen is designated in accordance with user input, the simulation unit makes the operation check while switching between ON and OFF of an input signal of a corresponding input device.

7. The program creation assistance device according to claim 1, wherein the method selection unit presents a selection screen where at least one of a method using a mode switch that switches between the normal mode and the maintenance mode and an enable switch that turns a safety output signal to ON, a method using the mode switch and a two-hand operation switch that turns the safety output signal to ON, a method using the mode switch and a hold-to-run switch that turns the safety output signal to ON, or a method using the mode switch only is selectable as the disabling method and selects the disabling method in accordance with user input via the selection screen.

8. The program creation assistance device according to claim 7, wherein the method selection unit further sets duration of disabling in accordance with user input.

9. The program creation assistance device according to claim 8, wherein the duration of disabling has a configurable range.

10. The program creation assistance device according to claim 1, wherein
    the creation unit has a first mode that allows to manually place and connect an input block and a functional block respectively and a second mode that allows to provide an unfinished safety program including that the plurality of blocks are already placed and connected, and
    the addition unit adds the disabling function to the unfinished safety program created by the creation unit in the second mode.

11. The program creation assistance device according to claim 1, wherein the user drag-and-drops a display item representing the disabling function to a program creation area on the edit screen for the safety program to provide the instruction.

* * * * *